(12) United States Patent
Blankenship et al.

(10) Patent No.: US 10,530,542 B2
(45) Date of Patent: Jan. 7, 2020

(54) TRANSMITTING POSITIONING REFERENCE SIGNALS

(71) Applicant: Telefonaktiebolaget LM Ericsson (publ), Stockholm (SE)

(72) Inventors: Yufei Blankenship, Kildeer, IL (US); Meng Wang, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/564,914

(22) PCT Filed: Mar. 31, 2016

(86) PCT No.: PCT/IB2016/051855
§ 371 (c)(1),
(2) Date: Oct. 6, 2017

(87) PCT Pub. No.: WO2016/162779
PCT Pub. Date: Oct. 13, 2016

(65) Prior Publication Data
US 2018/0098187 A1 Apr. 5, 2018

Related U.S. Application Data

(60) Provisional application No. 62/144,141, filed on Apr. 7, 2015.

(51) Int. Cl.
*G01S 5/02* (2010.01)
*H04W 4/02* (2018.01)
(Continued)

(52) U.S. Cl.
CPC .............. *H04L 5/0048* (2013.01); *G01S 5/02* (2013.01); *H04L 27/2602* (2013.01);
(Continued)

(58) Field of Classification Search
CPC . G01S 5/10; G01S 5/0236; G01S 1/20; G01S 5/0226; G01S 1/042; G01S 5/0036;
(Continued)

(56) References Cited

U.S. PATENT DOCUMENTS 9,420,414 B2 8/2016 Duan
2011/0081933 A1* 4/2011 Suh ................ G01S 5/0236
455/509

(Continued)

FOREIGN PATENT DOCUMENTS

KR 20110037431 A 4/2011
KR 20120023645 A 3/2012
WO 2014036874 A1 3/2014

OTHER PUBLICATIONS

Author Unknown, "Technical Specification Group Radio Access Network; Evolved Universal Terrestrial Radio Access (E-UTRA); Requirements for support of radio resource management (Release 12)," Technical Specification 36.133, Version 12.7.0, 3GPP Organizational Partners, Mar. 2015, 1,014 pages.
(Continued)

*Primary Examiner* — Yuwen Pan
*Assistant Examiner* — Umair Ahsan
(74) *Attorney, Agent, or Firm* — Withrow & Terranova, PLLC

(57) ABSTRACT

Systems and methods are disclosed herein that relate wireless device positioning based on cell portion specific Positioning Reference Signals (PRSs) by multiple Transmit Points (TPs) in a shared cell. In some embodiments, a method of operation of a TP in a cellular communications network is provided. The TP is one of multiple of non-colocated TPs of a shared cell that has a shared cell identifier. The method of operation of the TP comprises transmitting a PRS having at least one parameter that is a function of a cell portion identifier of the TP, where the at least one parameter
(Continued)

comprises a frequency-shift of the PRS, a portion of a system bandwidth in which the PRS is transmitted, and/or a PRS sequence used for the PRS. By transmitting cell-portion-specific PRSs, the TPs in the shared cell enable wireless device positioning based on PRSs transmitted by the non-co-located TPs.

11 Claims, 19 Drawing Sheets

(51) Int. Cl.
  *H04W 64/00* (2009.01)
  *H04L 5/00* (2006.01)
  *H04L 27/26* (2006.01)

(52) U.S. Cl.
  CPC ........... *H04L 27/2613* (2013.01); *H04W 4/02* (2013.01); *H04W 64/00* (2013.01)

(58) Field of Classification Search
  CPC ... H04W 64/00; H04W 64/006; H04W 4/023; H04L 5/00; H04L 5/0048; H04L 27/2613; H04L 27/26; H04L 27/2602; H04L 27/2655
  See application file for complete search history.

(56) References Cited

U.S. PATENT DOCUMENTS

| | | | | |
|---|---|---|---|---|
| 2011/0124347 | A1* | 5/2011 | Chen | H04W 64/00 455/456.1 |
| 2013/0229992 | A1* | 9/2013 | Yue | H04L 5/001 370/329 |
| 2014/0176366 | A1* | 6/2014 | Fischer | H04W 64/006 342/374 |
| 2015/0208198 | A1* | 7/2015 | Duan | H04W 64/00 455/456.2 |
| 2016/0195601 | A1* | 7/2016 | Siomina | G01S 5/0205 455/456.1 |
| 2017/0006575 | A1* | 1/2017 | Cui | H04W 64/00 |
| 2017/0097404 | A1* | 4/2017 | Siomina | G01S 5/10 |

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.0.0, 3GPP Organizational Partners, Dec. 2013, 120 pages.
Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.
Author Unknown, "Technical Specification Group Radio Access Network; Evolved Universal Terrestrial Radio Access Network (E-UTRAN); Stage 2 functional specification of User Equipment (UE) positioning in E-UTRAN (Release 12)," Technical Specification 36.305, Version 12.0.0, 3GPP Organizational Partners, Dec. 2013, 59 pages.
Author Unknown, "Technical Specification Group Radio Access Network; Evolved Universal Terrestrial Radio Access (E-UTRA); LTE Positioning Protocol (LPP) (Release 12)," Technical Specification 36.355, Version 12.4.0, 3GPP Organizational Partners, Mar. 2015, 126 pages.
Author Unknown, "Technical Specification Group Radio Access Network; Evolved Universal Terrestrial Radio Access (E-UTRA); LTE Positioning Protocol A (LPPa) (Release 12)," Technical Specification 36.455, Version 12.2.0, 3GPP Organizational Partners, Mar. 2015, 62 pages.
Author Unknown, "Technical Specification Group Radio Access Network; Evolved Universal Terrestrial Radio Access (E-UTRA); LTE Positioning Protocol A (LPPa) (Release 13)," Technical Specification 36.455, Version 13.0.0, 3GPP Organizational Partners, Dec. 2015, 62 pages.
Fischer, Sven, "Observed Time Difference of Arrival (OTDOA) Positioning in 3GPP LTE," Jun. 6, 2014, Qualcomm Technologies, Inc., 62 pages.
International Search Report and Written Opinion for International Patent Application No. PCT/IB2016/051855, dated Jul. 8, 2016, 13 pages.
Author Unknown, "Technical Specification Group Radio Access Network; Feasibility of positioning enhancements for E-UTRA (Release 13)," 3GPP TR 36.855 Version 13.0.0, Jan. 2015, 3GPP Organizational Partners, 52 pages.
Nokia Networks, "R1-150660: Potential enhancements for indoor positioning," 3GPP TSG-RAN WG1 #80, Feb. 9-13, 2015, Athens, Greece, 1 page.
Notice of Preliminary Rejection for Korean Patent Application No. 2017-7030496, dated Apr. 15, 2019, 10 pages.
Notice of Final Rejection for Korean Patent Application No. 10-2017-7030496, dated Oct. 10, 2019, 6 pages.

* cited by examiner

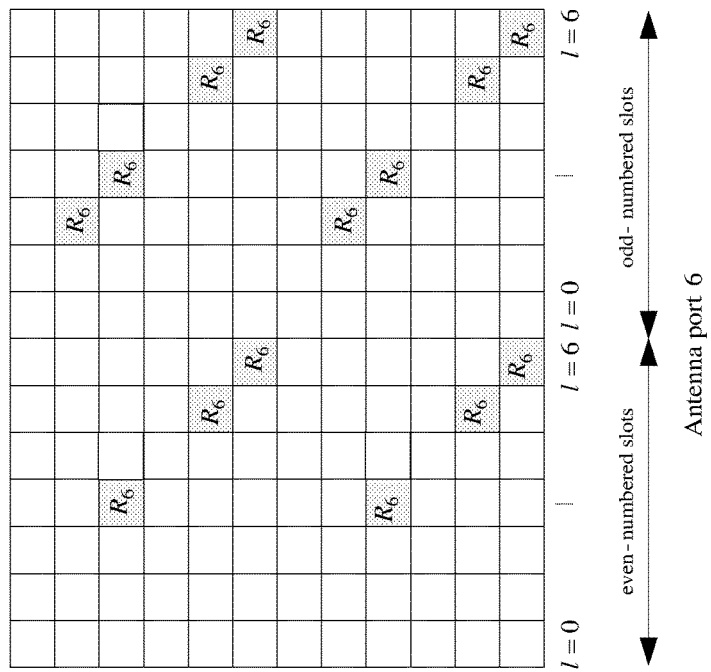
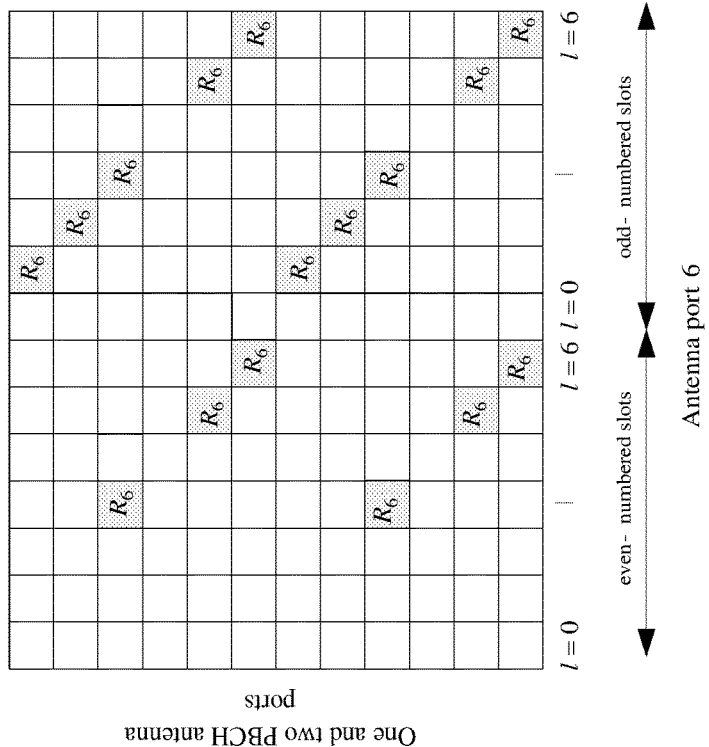
FIG. 3

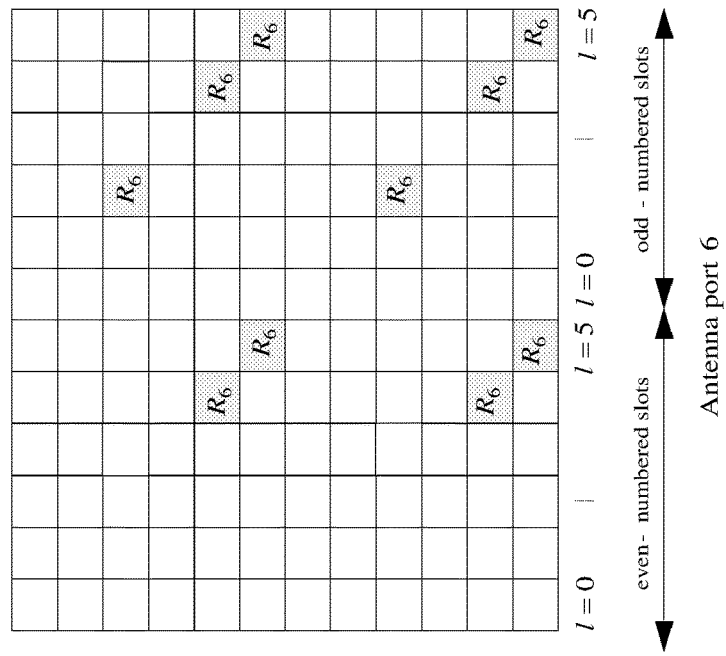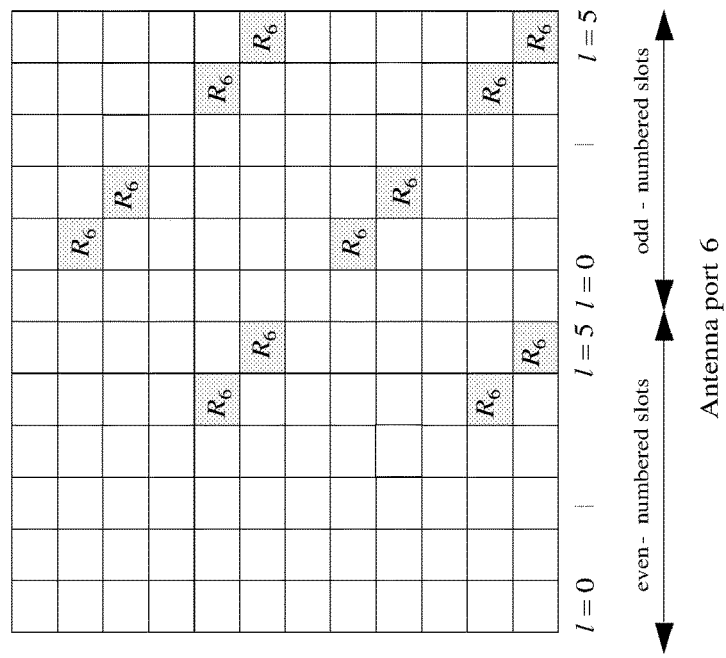
FIG. 4

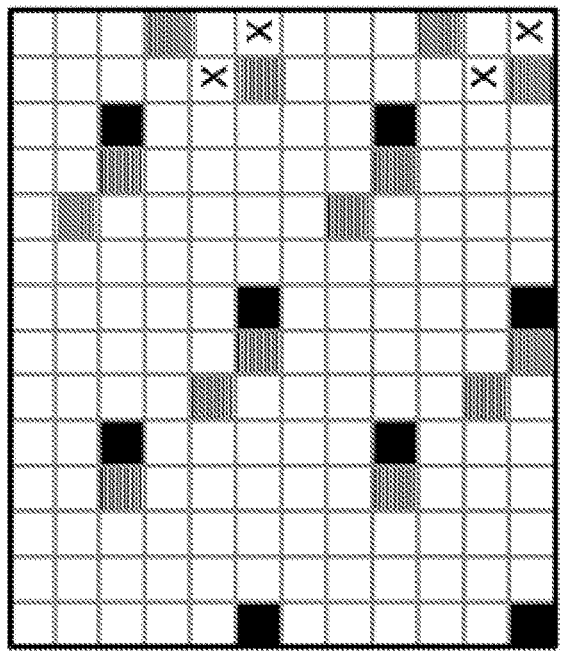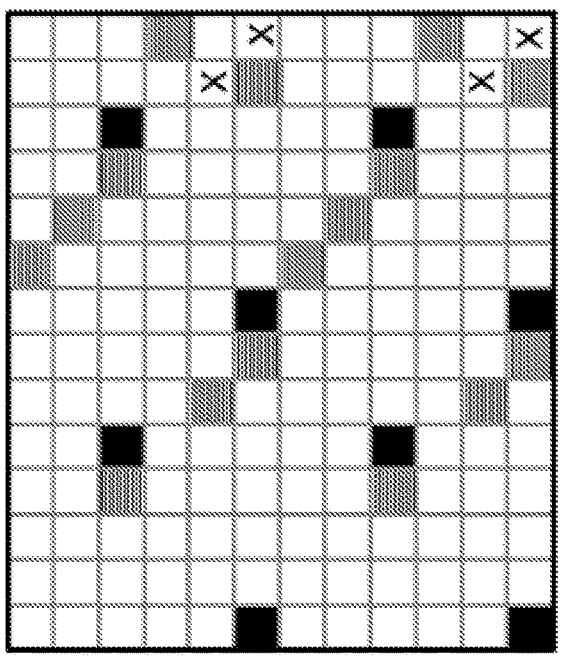
FIG. 7

```
-- ASN1START

OTDOA-ReferenceCellInfo ::= SEQUENCE {
    physCellId              INTEGER (0..503),
    cellGlobalId            ECGI                                              OPTIONAL,   -- Need ON
    earfcnRef               ARFCN-ValueEUTRA                                  OPTIONAL,   -- Cond NotSameAsServ0
    antennaPortConfig       ENUMERATED {ports1-or-2, ports4, ...}             OPTIONAL,
    cpLength                ENUMERATED { normal, extended, ...},
    prsInfo                 PRS-Info                                          OPTIONAL,   -- Cond NotSameAsServ1
    cellPortionInfoList     SEQUENCE (SIZE (1..maxCellPortion)) OF cellPortionInfo        OPTIONAL,   -- Cond PRS
    ...,
    [[ earfcnRef-v9a0       ARFCN-ValueEUTRA-v9a0                             OPTIONAL    -- Cond NotSameAsServ2
    ]]
} cellPortionInfo ::= SEQUENCE {
    cellPortionID           INTEGER (0..255..),                               OPTIONAL,   -- Cond ePRS
    eprsInfo                ePRS-Info                                         OPTIONAL,   -- Cond ePRS
}

-- ASN1STOP
```

```
-- ASN1START ePRS-Info ::= SEQUENCE {
    eprs-Bandwidth              ENUMERATED { n6, n15, n25, n50, n75, n100, ...},
    eprs-ConfigurationIndex     INTEGER (0..4095),
    eprs-numDL-Frames           ENUMERATED {sf-1, sf-2, sf-4, sf-6, ...},
    ...,
    eprs-MutingInfo-r9          CHOICE {
        po2-r9                  BIT STRING (SIZE(2)),
        po4-r9                  BIT STRING (SIZE(4)),
        po8-r9                  BIT STRING (SIZE(8)),
        po16-r9                 BIT STRING (SIZE(16)),
        ...
    }                                                                         OPTIONAL    -- Need OP
}

-- ASN1STOP
```

FIG. 10

| IE/Group Name | Presence | Range | IE type and reference | Semantics description | Criticality | Assigned Criticality |
|---|---|---|---|---|---|---|
| Message Type | M | | 9.2.3 | | YES | reject |
| LPPa Transaction ID | M | | 9.2.4 | | - | |
| OTDOA Cells | | 1 .. <maxCellineNB> | | Served cells that broadcast PRS | GLOBAL | ignore |
| >OTDOA Cell Information | M | | 9.2.7 | | - | - |
| >>OTDOA Cell Portions | | 1 .. <maxCellPortionInCell> | | Served cell portions that broadcast ePRS | GLOBAL | ignore |
| >>>OTDOA Cell Portion Information | M | | x.x.x | | - | - |
| Criticality Diagnostics | O | | 9.2.2 | | YES | ignore |

| IE/Group Name | Presence | Range | IE type and reference | Semantics description |
|---|---|---|---|---|
| OTDOA CellPortion Information | | 1 .. <maxnoOTDOAtypes> | | |
| >CHOICE *OTDOA Cell Portion Information Item* | M | | | |
| >> Cell Portion ID | M | | INTEGER (0.255, ...) | Cell Portion ID |
| >>ePRS Bandwidth | M | | ENUMERATED (bw6, bw15, bw25, bw50, bw75, bw100, ...) | Transmission bandwidth of ePRS |
| >>ePRS Configuration Index | M | | INTEGER (0..4095, ...) | ePRS Configuration Index, ref TS 36.211[6] |
| >>Number of DL Frames | M | | ENUMERATED (sf1, sf2, sf4, sf6,...) | Number of consecutive downlink subframes $N_{PRS}$ with ePRS, refTS 36.211 [6] |
| >>E-UTRAN TransmitPoint Position | M | | x.x.x | The configured estimated geographical position of the antenna of the cell portion |
| >>ePRS Muting Configuration | M | | x.x.x | The configuration of positioning reference signals muting pattern, when applicable |

*FIG. 11*

TRANSMITTING POSITIONING REFERENCE SIGNALS

This application is a 35 U.S.C. § 371 national phase filing of International Application No. PCT/IB2016/051855, filed Mar. 31, 2016, which claims the benefit of U.S. Provisional Application No. 62/144,141, filed Apr. 7, 2015, the disclosures of which are incorporated herein by reference in their entireties.

TECHNICAL FIELD

The present disclosure relates to the transmission of Positioning Reference Signals (PRSs) in a cellular communications network.

BACKGROUND

Location-based services and emergency call positioning drive the development of positioning in wireless networks. Positioning support in Third Generation Partnership Project (3GPP) Long Term Evolution (LTE) was introduced in Release 9. This enables operators to retrieve position information for location-based services and to meet regulatory emergency call positioning requirements. Global Positioning System (GPS)-enabled terminals can meet the requirement for positioning, but they cannot provide the required availability due to the satellite signals being blocked in urban and indoor environments. Therefore, other techniques are needed in such environments.

Positioning in LTE is supported by the architecture illustrated in FIG. 1, with direct interactions between a User Equipment device (UE) and an Enhanced Serving Mobile Location Center (E-SMLC), which may also be referred to as a location server, are via the LTE Positioning Protocol (LPP). Moreover, there are also interactions between the E-SMLC and an enhanced or evolved Node B (eNB) via the LPP Annex (LPPa) protocol, to some extent supported by interactions between the eNB and the UE via the Radio Resource Control (RRC) protocol.

The following positioning techniques are considered in LTE (see, for example, 3GPP Technical Specification (TS) 36.305 v12.0.0):
  Enhanced Cell Identifier/Identity (ID). Essentially, cell ID information associates the UE to the serving area of a serving cell, and then additional information determines a finer granularity position.
  Assisted Global Navigation Satellite System (GNSS). GNSS information retrieved by the UE is supported by assistance information provided to the UE from the E-SMLC.
  Observed Time Difference of Arrival (OTDOA). The UE estimates the time difference of reference signals from different base stations and sends this information to the E-SMLC for multilateration.
  Uplink Time Difference of Arrival (UTDOA): The UE is requested to transmit a specific waveform that is detected by multiple location measurement units (e.g., an eNB) at known positions. These measurements are forwarded to the E-SMLC for multilateration.

OTDOA is a UE-assisted method in which the UE measures the Time of Arrival (TOA) of specific Positioning Reference Signals (PRSs) from multiple eNBs and computes the relative differences. These Reference Signal Time Difference (RSTD) measurements are quantized and reported via LPP to the E-SMLC together with an accuracy assessment. Based on known positions of the eNBs and their mutual time synchronization, the E-SMLC estimates the UE position from the RSTD measurements and covariance reports using multilateration. The accuracy depends on the radio conditions of the received signals, the number of received signals, as well as the deployment, which means that it will vary spatially.

FIG. 2 illustrates multilateration in OTDOA while considering eNB1 as the reference cell. The TOAs from neighboring cells are subtracted from that of the reference cell to provide corresponding RSTD measurements. Each such RSTD measurement determines a hyperbola, and the intersecting point of these hyperbolas can be considered as the UE position.

In principle, it is possible to measure RSTD on any downlink signals e.g., Cell-Specific Reference Signals (CRSs). However, in OTDOA, the UE is required to detect multiple neighboring cell signals, but these signals suffer from poor hearability. Hence, PRSs have been introduced to improve OTDOA positioning performance. FIGS. 3 and 4 show the arrangement of the PRSs (i.e., the PRS patterns) in one resource block for normal Cyclic Prefix (CP) and extended CP, respectively. In such a PRS subframe, in order to reduce the interference with neighboring cells, no Physical Downlink Shared Channel (PDSCH) data is transmitted. The Physical Downlink Control Channel (PDCCH) and CRSs are retained in the subframe, while PRSs are distributed in a "diagonal" way in between CRSs. Similar to CRS, a cell-specific frequency shift (defined as Physical Cell Identity (PCI) modulo 6) is applied to the PRS pattern, which helps avoid time-frequency PRS collision for up to six neighbor cells. Mathematically, according to 3GPP TS 36.211 V13.0.0, the PRSs are mapped to the resource element (k, l), i.e. the time-frequency PRS pattern can be written as:
  for normal CP:

$$k = 6(m + N_{RB}^{DL} - N_{RB}^{PRS}) + (6 - l - v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (1 \text{ or } PBCH \text{ antenna ports}) \\ 2, 3, 5, 6 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

where $n_s$ is the slot number and $N_{RB}^{PRS}$, and $N_{RB}^{DL}$, and $N_{RB}^{max,DL}$ denote the number of Resource Blocks (RBs) for PRS, PDSCH, and downlink maximum bandwidth, respectively; and
  for extended CP:

$$k = 6(m + N_{RB}^{DL} - N_{RB}^{PRS}) + (5 - l - v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \text{ } PBCH \text{ antenna ports}) \\ 2, 4, 5 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}.$$

The bandwidth for $P_{RB}^{PRS}$, is configured by higher layers and the cell-specific frequency shift is given by $v_{shift} = N_{ID}^{cell} \bmod 6$.

In an LTE system, consecutive PRS subframes (a.k.a. positioning occasions) are transmitted periodically in the downlink. In other words, PRSs are be transmitted in $N_{PRS}$ consecutive downlink subframes, where $N_{PRS}$ is configured by higher layers. According to the LTE specifications, one positioning occasion may contain up to six consecutive PRS subframes. The period of one positioning occasion can be configured to every $T_{PRS}$=160, 320, 640, and 1280 milliseconds (ms). It is noted that, in Time Division Duplexing (TDD) mode, uplink subframes and other special frames cannot contain PRSs. Another parameter to characterize the PRS transmission schedule is the cell-specific subframe offset, which defines the starting subframe of PRS transmission relative to System Frame Number (SFN)=0. As shown in Table 1 below (which is reproduced from 3GPP TS 36.211), the PRS periodicity $T_{PRS}$ and subframe offset $\Delta_{PRS}$ are derived from the PRS configuration index $I_{PRS}$. The PRS configuration index $I_{PRS}$ is configured by higher layers. PRSs are transmitted only in configured downlink subframes. PRSs are not transmitted in Downlink Pilot Time Slots (DwPTSs). The PRS instances, for the first subframe of the $N_{PRS}$ downlink subframes, must satisfy $(10 \times n_f + \lfloor n_s/2 \rfloor - \Delta_{PRS}) \mod T_{PRS} = 0$.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

In some cases, in particular in a dense deployment, using only a cell-specific frequency shift may not be sufficient to avoid interference from neighboring cells. Therefore, PRS muting has been introduced to further reduce inter-cell interference by muting PRS transmissions in other cells based on a periodic "muting pattern."

The positioning architecture in LTE operates via two positioning protocols: the LPP and the LPPa. LPP is used for communication between the E-SMLC and a UE, while LPPa is the communication protocol between an eNB and the E-SMLC. The information exchange between an eNB and an E-SMLC, as specified in 3GPP TS 36.455 V13.0.0, may be used for OTDOA positioning to support data collection from eNBs and configurations to eNBs. Such configuration information includes PRS configuration index table, number of consecutive PRSs, PRS bandwidth, etc.

In regard to RSTD reporting, the UE estimates the TOA of a reference cell and other detected cells based on received assistance information from the E-SMLC. Then, the UE computes the RSTD of each detected cell in relation to the reference cell. The RSTD measurements are subject to a quantization with a resolution of 1 Ts for RSTD measurement within ±4096 Ts, and 5 Ts otherwise (1 Ts=1/(15000× 2048) seconds is the LTE basic time unit) (see 3GPP TS 36.133, Section 9.1.10.3).

In addition, the UE estimates the RSTD measurement quality and reports the uncertainty via a range:

[nR,(n+1)R−1], where the reporting resolution is R={5, 10, 20, 30} meters, and n is an index to indicate the value range within which the RSTD uncertainty is estimated to be (see 3GPP TS 36.355, Section 6.5.1.5).

Current PRS introduced in LTE Release 9 was designed for macro base stations to support mainly outdoor positioning. As one type of reference signal, the generation of PRSs is associated with PCI and, therefore, PCI is the label to differentiate the PRSs from neighboring cells. Ongoing enhancements to the United States (US) Federal Communication Commission (FCC) Enhanced 911 capability are focusing on in-building positioning. For indoor small-cell scenarios, low-power Remote Radio Heads (RRHs) or distributed antennas are popularly deployed to enhance the spectral efficiency. However, those Transmit Points (TPs) belonging to the same eNB share the same PCI. As defined in 3GPP TS 36.455 V12.2.0, the "E-UTRAN Access Point Position" is associated with PCI, i.e., the locations of TPs sharing the same PCI cannot be differentiated. Hence, they cannot be used for indoor positioning based on OTDOA.

SUMMARY

Systems and methods are disclosed herein that relate wireless device positioning based on cell portion specific Positioning Reference Signals (PRSs) by multiple Transmit Points (TPs) in a shared cell. In some embodiments, a method of operation of a TP in a cellular communications network is provided. The TP is one of multiple of non-co-located TPs of a shared cell that has a shared cell identifier. The method of operation of the TP comprises transmitting a PRS having at least one parameter that is a function of a cell portion identifier of the TP. The at least one parameter of the PRS that is a function of the cell portion identifier of the TP comprises a frequency-shift of the PRS, a portion of a system bandwidth in which the PRS is transmitted, and/or a PRS sequence used for the PRS. By transmitting cell-portion-specific PRSs, the TPs in the shared cell enable wireless device positioning based on PRSs transmitted by the non-co-located TPs in the shared cell.

In some embodiments, the at least one parameter of the PRS that is a function of the cell portion identifier of the TP comprises the frequency-shift of the PRS. Further, in some embodiments, the frequency-shift of the PRS is a function of the cell portion identifier of the TP and the shared cell identifier. In some embodiments, the frequency-shift of the PRS is defined as:

$$v_{shift} = (N_{ID}^{cell} + N_{ID}^{cellPortion}) \mod 6$$

where $v_{shift}$ is the frequency-shift of the PRS, $N_{ID}^{cell}$ is the shared cell identifier, and $N_{ID}^{cellPortion}$ is the cell potion identifier of the TP.

In some embodiments, the at least one parameter of the PRS that is a function of the cell portion identifier of the TP comprises the portion of the system bandwidth in which the PRS is transmitted. In some embodiments, a mapping between the portion of the system bandwidth in which the PRS is transmitted and the cell portion identifier is predefined. In some other embodiments, a mapping between the portion of the system bandwidth in which the PRS is transmitted and the cell portion identifier is randomly assigned.

In some embodiments, the at least one parameter of the PRS that is a function of the cell portion identifier of the TP comprises the PRS sequence used for the PRS.

In some embodiments, the method of operation of the TP further comprises transmitting a second PRS that is cell specific. Further, in some embodiments, a PRS pattern of the PRS having the at least one parameter that is a function of the cell portion identifier of the TP is different than a PRS pattern of the second PRS. In some embodiments, the PRS pattern of the PRS having the at least one parameter that is a function of the cell portion identifier of the TP is the same as the PRS pattern of the second PRS other than the last two resource element positions of the PRS.

In some embodiments, the PRS having the at least one parameter that is a function of the cell portion identifier of the TP does not overlap, in time, the second PRS that is cell specific. In some embodiments, each PRS occasion of the PRS having the at least one parameter that is a function of the cell portion identifier of the TP is separated in time from each PRS occasion of the second PRS that is cell specific. In other embodiments, at least one PRS occasion of the PRS having the at least one parameter that is a function of the cell portion identifier of the TP is adjacent in time to at least one PRS occasion of the second PRS that is cell specific.

Embodiments of a TP in a cellular network are also disclosed. The TP is one of multiple non-co-located TPs of a shared cell that has a shared cell identifier. The TP comprises a transmitter operable to transmit, via the transmitter, a PRS having at least one parameter that is a function of a cell portion identifier of the TP. The at least one parameter comprises a frequency-shift of the PRS, a portion of a system bandwidth in which the PRS is transmitted, and/or a PRS sequence used for the PRS.

Embodiments of a base station for operation in a cellular communications network are also disclosed. In some embodiments, the base station comprises a plurality of non-co-located TPs serving a shared cell having a shared cell identifier. At least some of the non-co-located TPs have different cell portion identifiers. The base station further comprises a detection unit communicatively coupled to the non-co-located TPs. The detection unit is operable to, for each TP of the non-co-located TPs, provide, to the TP for transmission, a PRS having at least one parameter that is a function of the cell portion identifier of the TP. The at least one parameter comprises a frequency-shift of the PRS, a portion of a system bandwidth in which the PRS is transmitted, and/or a PRS sequence used for the PRS.

In some embodiments, the at least one parameter of the PRS that is a function of the cell portion identifier of the TP comprises the frequency-shift of the PRS. In some embodiments, the frequency-shift of the PRS is a function of the cell portion identifier of the TP and the shared cell identifier. In some embodiments, the frequency-shift of the PRS is defined as:

$$v_{shift}=(N_{ID}^{cell}+N_{ID}^{cellPortion}) \bmod 6$$

where $v_{shift}$ is the frequency-shift of the PRS, $N_{ID}^{cell}$ is the shared cell identifier, and $N_{ID}^{cellPortion}$ is the cell potion identifier of the TP.

In some embodiments, the at least one parameter of the PRS that is a function of the cell portion identifier of the TP comprises the portion of the system bandwidth in which the PRS is transmitted.

In some embodiments, the at least one parameter of the PRS that is a function of the cell portion identifier of the TP comprises the PRS sequence used for the PRS.

In some embodiments, the detection unit is further operable to provide, to each of the plurality of TPs for transmission, a second PRS that is cell specific. Further, in some embodiments, a PRS pattern of the PRS having the at least one parameter that is a function of the cell portion identifier of the TP is different than a PRS pattern of the second PRS.

In some embodiments, the PRS pattern of the PRS having the at least one parameter that is a function of the cell portion identifier of the TP is the same as the PRS pattern of the second PRS other than the last two resource element positions of the PRS.

In some embodiments, the PRS having the at least one parameter that is a function of the cell portion identifier of the TP does not overlap, in time, the second PRS that is cell specific.

In some embodiments, a base station for operation in a cellular communications network is provided. The base station has a plurality of non-co-located TPs serving a shared cell having a shared cell identifier. At least some of the plurality of non-co-located TPs have different cell portion identifiers. The base station comprises a module operable to, for each TP of the plurality of non-co-located TPs, provide, to the TP for transmission, a PRS having at least one parameter that is a function of a cell portion identifier of the TP. The at least one parameter comprising a frequency-shift of the PRS, a portion of a system bandwidth in which the PRS is transmitted, and/or a PRS sequence used for the PRS.

Embodiments of a method of operation of a wireless device in a cellular communications network are also provided. In some embodiments, the method of operation of a wireless device comprises receiving assistance information from the cellular communications network, where the assistance information comprises information that enables the wireless device to receive cell portion specific PRSs from a plurality of non-co-located TPs of a shared cell. The method further comprises receiving at least one of the cell portion specific PRSs from respective non-co-located TPs of the shared cell and performing Received Signal Time Difference (RSTD) measurements on the at least one of the cell portion identifier specific PRSs.

In some embodiments, the method further comprises determining a position of the wireless device based on the RSTD measurements on the at least one of the cell portion specific PRSs.

In some embodiments, the method further comprises sending the RSTD measurements on the at least one of the cell portion specific PRSs to a network node of the cellular communications network.

In some embodiments, the assistance information comprises a list of cell portion identifiers corresponding to the cell portion specific PRSs.

In some embodiments, the assistance information comprises physical locations of the non-co-located TPs.

In some embodiments, the assistance information comprises one or more configuration parameters for the cell portion specific PRSs.

In some embodiments, for each cell portion specific PRS, the one or more configuration parameters comprise one or more time-domain parameters for the cell portion specific PRS. Further, in some embodiments, the one or more time-domain parameters comprise a number, $N_{PRS,cellP}$, of consecutive downlink subframes on which the cell portion specific PRS is transmitted in a PRS occasion; a subframe offset, $\Delta_{PRS,cellP}$, for a first subframe of the number, $N_{PRS,cellP}$, of consecutive downlink subframes on which the cell portion specific PRS is transmitted in a PRS occasion; a periodicity, $T_{PRS}$, of the cell portion specific PRS; and/or a muting pattern of the cell portion specific PRS.

In some embodiments, for each cell portion specific PRS, the one or more configuration parameters comprise one or more frequency-domain parameters for the cell portion specific PRS. In some embodiments, for each cell portion specific PRS, the one or more frequency-domain parameters comprise information that indicates a set of physical resource blocks in the frequency domain in which the cell portion specific PRS is transmitted.

Embodiments of a wireless device for operation in a cellular communications network comprises a transceiver and at least one processor operable to: receive, via the transceiver, assistance information from the cellular communications network, the assistance information comprising information that enables the wireless device to receive cell portion specific PRSs from a plurality of non-co-located TPs of a shared cell; receive, via the transceiver, at least one of the cell portion specific PRSs from respective non-co-located TPs of the shared cell; and perform RSTD measurements on at least one of the cell portion identifier specific PRSs.

In some embodiments, a wireless device for operation in a cellular communications network comprises means for receiving assistance information from the cellular communications network, the assistance information comprising information that enables the wireless device to receive cell portion PRSs from a plurality of non-co-located TPs of a shared cell; means for receiving at least one of the cell portion specific PRSs from respective non-co-located TPs of the shared cell; and means for performing RSTD measurements on at least one of the cell portion identifier specific PRSs.

In some embodiments, a wireless device for operation in a cellular communications network comprises an assistance information reception module operable to receive assistance information from the cellular communications network, the assistance information comprising information that enables the wireless device to receive cell portion specific PRSs from a plurality of non-co-located TPs of a shared cell; a PRS reception module operable to receive at least one of the cell portion specific PRSs from respective non-co-located TPs of the shared cell; and a measurement module operable to perform RSTD measurements on at least one of the cell portion identifier specific PRSs.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3 and 4 illustrate legacy Positioning Reference Signal (PRS) patterns;

FIG. 7 illustrates one example of an enhanced or evolved PRS (ePRS) pattern with improved correlation property, where compared to the legacy PRS pattern shown in FIG. 3, the Resource Elements (REs) in the last two symbols are adjusted such that the REs in the ePRS pattern are distributed more evenly in frequency in accordance with some embodiments of the present disclosure;

FIG. 10 illustrates modifications to Information Elements (IEs) used for LTE Positioning Protocol (LPP) signaling in accordance with some embodiments of the present disclosure;

FIG. 11 illustrates a modified OTDOA INFORMATION RESPONSE message utilized for LPP Annex (LPPa) signaling in accordance with some embodiments of the present disclosure;

DETAILED DESCRIPTION

Figure 1:
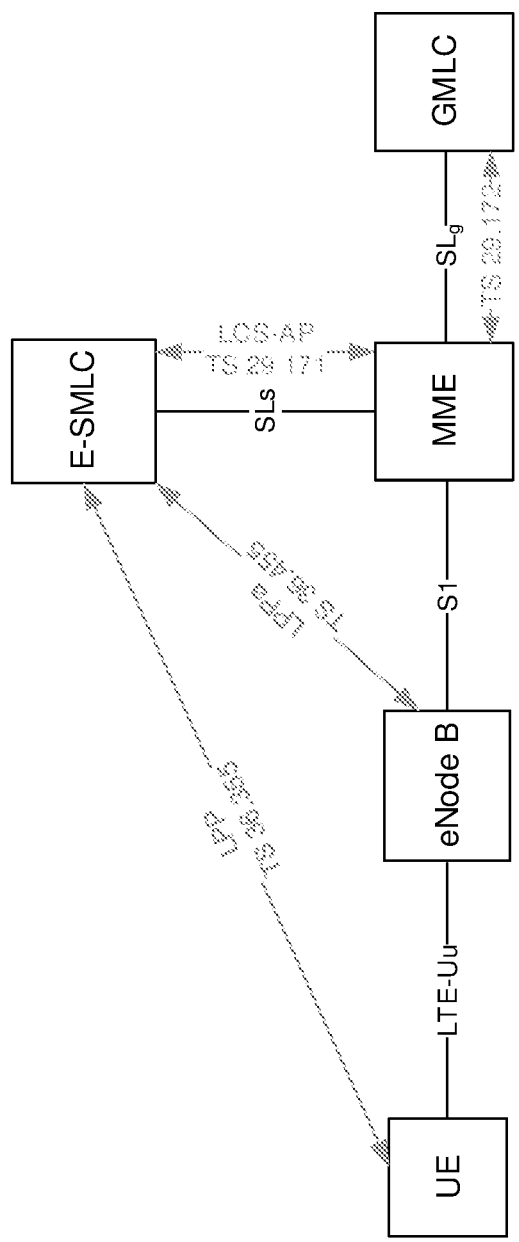
FIG. 1 illustrates an Long Term Evolution (LTE) architecture supporting positioning.
Figure 2:
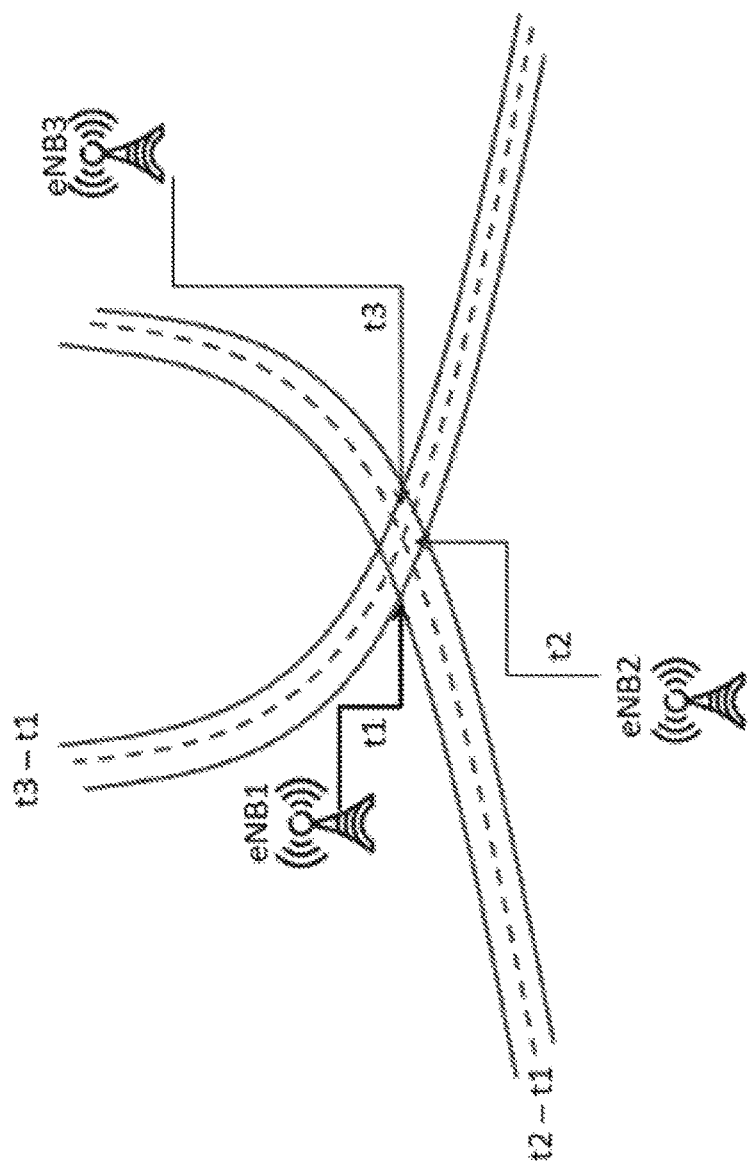
FIG. 2 illustrates multilateration in accordance with an Observed Time Difference of Arrival (OTDOA) positioning scheme.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network, a Machine Type Communication (MTC) device, and a Narrowband Internet of Things (IoT) device.

Network Node: As used herein, a "network node" is any node that is either part of the radio access network or the core network of a cellular communications network/system.

Transmit Point: As used herein, a "transmit point" or "TP" is a set of co-located antennas. More specifically, a TP is a device or system that implements a set of co-located antennas. A cell can correspond to one or more TPs. Some example TPs are, but are not limited to, Remote Radio Heads (RRHs) and a set of co-located antenna(s) in a Distributed Antenna System (DAS).

Cell Portion: As used herein, a "cell portion" is a geographical part of a cell.

Note that the description given herein focuses on a 3GPP cellular communications system and, as such, 3GPP LTE terminology or terminology similar to 3GPP LTE terminology is oftentimes used. However, the concepts disclosed herein are not limited to a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Systems and methods are disclosed herein that relate to the transmission of cell portion specific Positioning Reference Signals (PRSs) by multiple TPs in a shared cell (i.e., the TPs shared the same cell identifier (e.g., the same Physical Cell Identity (PCI)). The concept of cell portion was introduced to the 3GPP LTE specification in Release 12 (see 3GPP Technical Specification (TS) 36.455 V12.2.0). A "cell portion" is a geographical part of a cell. A cell portion is semi-static, and identical for both the uplink and the downlink. Within a cell, a cell portion is uniquely identified by its Cell Portion Identity (ID). In other words, the Cell Portion ID is the unique identifier for a cell portion within a cell. Table 9.2.12-1 of 3GPP TS 36.455 V12.2.0 defines Cell Portion ID as follows:

| IE/Group Name | Presence | Range | IE type and reference | Semantics description |
|---|---|---|---|---|
| Cell Portion ID | M | | INTEGER (0 . . . 255, . . .) | |

If the Report Characteristics Information Element (IE) is set to "OnDemand," the eNB shall return the result of the measurement in the Enhanced Cell ID (E-CID) MEASUREMENT INITIATION RESPONSE message including, if available, the Evolved Universal Terrestrial Radio Access Node (E-UTRAN) Access Point Position IE in the E-CID Measurement Result IE, and the Enhanced Serving Mobile Location Center (E-SMLC) shall consider that the E-CID measurements for the UE has been terminated by the eNB. If available, the eNB shall include the Cell Portion ID IE in the E-CID MEASUREMENT INITIATION RESPONSE message. Upon reception of the Cell Portion ID IE, the E-SMLC may use the value as the cell portion for the measurement.

A set of geographically collocated antennas that correspond to a particular sectorization are configured as a cell. A UE (also referred to herein as a terminal) can be connected to a single cell at a given time based on associated maximum received signal power. This cell then becomes the UE's serving cell. To support operation of Coordinated Multipoint (CoMP), phantom cell, and other enhancements, non-co-located antennas are introduced, including distributed antennas, RRHs, etc. Thus, the antennas configured as a cell may not be geographically co-located. The term TP refers to a set of co-located antennas, and a cell can correspond to one or more of such TPs. Note that a single geographical site location may contain multiple TPs in case of sectorization, with one TP corresponding to one sector.

For positioning purposes, the UE may be located close to one TP, but far away from another TP, even though the TPs may belong to the same cell. Thus, it is desirable to be able to receive individual positioning signals (referred to herein as PRSs) from each TP separately, and perform positioning estimation based on at least some of the positioning signals (e.g., the best PRSs) received at the UE from the TPs.

Embodiments of the present disclosure include apparatuses and methods for TPs (e.g., RRHs and/or distributed antennas) in a shared cell (i.e., TPs that share the same cell identity or PCI) to perform Observed Time Difference of Arrival (OTDOA)-based positioning. By signaling the Cell Portion ID, the TPs can be separated geographically such that they can transmit independent PRSs as if they were eNBs. To avoid interference between the PRSs from different TPs, different PRS patterns or scheduling shall be used. Several embodiments are presented below including reusing current PRSs with frequency shift associated with the Cell Portion ID, a new PRS pattern with different time-frequency mapping, and scheduling new PRSs and legacy PRSs in non-overlapping frames. The disclosure also presents how to add signaling information related to the Cell Portion ID to LTE Positioning Protocol (LPP) to enable OTDOA at the TP level. The disclosure also describes the signaling mechanism for enhanced or evolved PRS (ePRS) configurations.

TPs that share the same PCI can transmit separate PRSs for positioning purposes. Interference between PRSs transmitted from different TPs can be mitigated.

Figure 5:
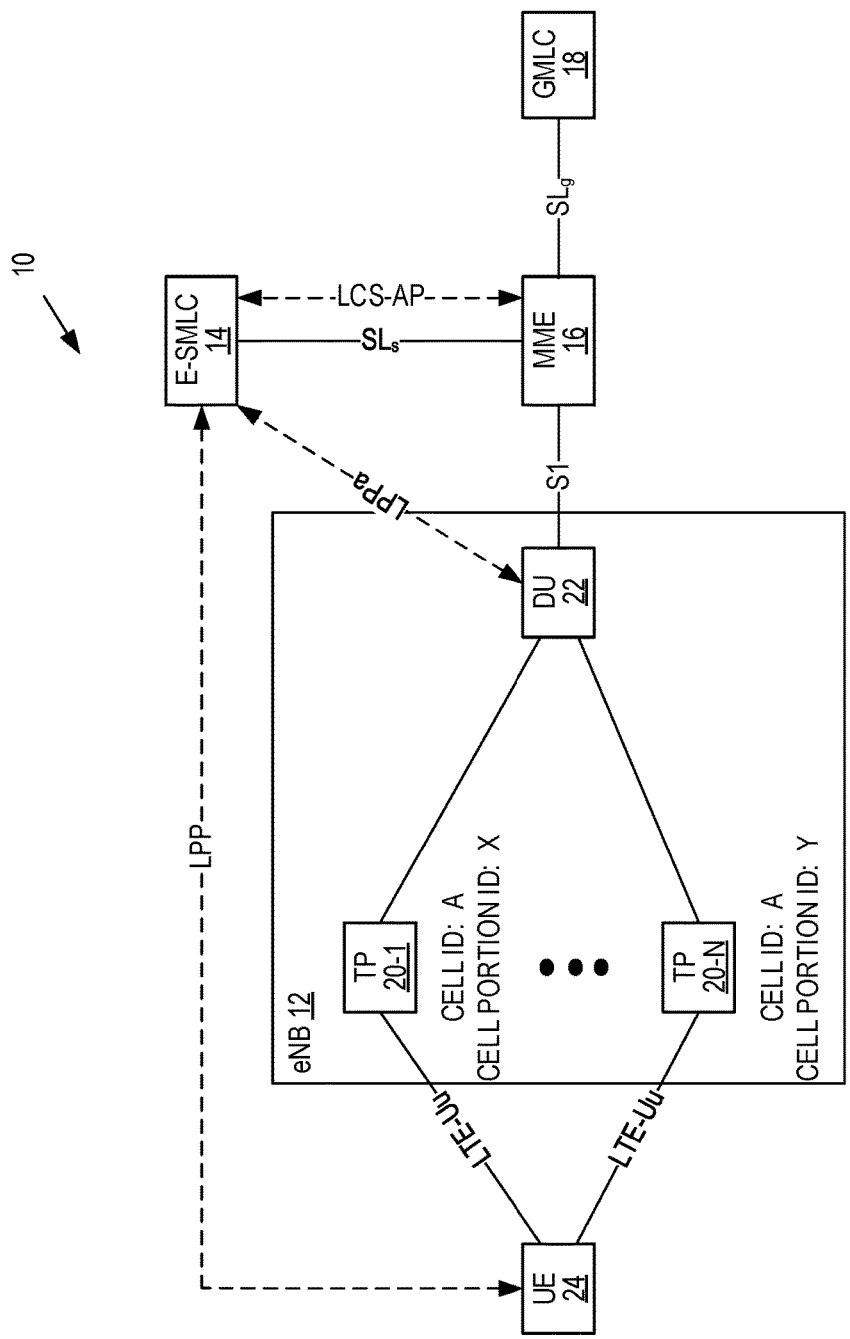
FIG. 5 illustrates one example of a cellular communications system in which embodiments of the present disclosure may be implemented.

Embodiments of the present disclosure are implemented in a cellular communications system. One example of a cellular communications system 10 is illustrated in FIG. 5. In this example, the cellular communications system 10 is an LTE system and, as such, LTE terminology is used. Note, however, that the present disclosure is not limited to LTE; rather, the concepts disclosed herein can be utilized in any cellular communications system that includes multiple non-co-located TPs sharing the same cell ID. In general, the cellular communications system 10 includes a cellular network including an eNB 12, an E-SMLC 14 (which may also be referred to herein as a location server), a Mobility Management Entity (MME) 16, and a Gateway Mobile Location Centre (GMLC) 18. The eNB 12 is part of a radio access network and, as such, may generally be referred to herein as a radio access node. Conversely, the E-SMLC 14, the MME 16, and the GMLC 18 are part of a core network and, as such, may generally be referred to herein as core network nodes.

Importantly, the eNB 12 includes a number of TPs 20-1 through 20-N connected to a centralized Detection Unit (DU) 22. The TPs 20-1 through 20-N operate according to a shared cell scheme and, as such, share the same cell ID, which in this example is denoted as Cell ID A. Conversely, the TPs 20-1 through 20-N are assigned or otherwise associated with different Cell Portion IDs. In this example, the TP 20-1 is associated with Cell Portion ID X, whereas the TP 20-N is associated with Cell Portion ID Y. Note that, in some embodiments, each TP 20 is assigned a different Cell Portion ID. In other embodiments, some of the TPs 20 may share the same Cell Portion ID (e.g., TPs 20 that are geographically close to one another (e.g., on the same floor of a building) may be associated with the same Cell Portion ID). A TP 20 can include an antenna or a set of co-located antennas in a DAS, a RRH, or the like. A TP 20 can include a transceiver and an antenna system (e.g., one or more antennas) for transmitting and receiving signals. A TP 20 may also include a processor.

The cellular communications system 10 also includes a UE 24 that transmits and receives wireless signals to and from the cellular network. The UE 24 can include a transceiver, a processor, and a memory. The transceiver is configured to send and receive wireless signals via an antenna system. The processor is configured to execute operations stored in memory.

Figure 6:
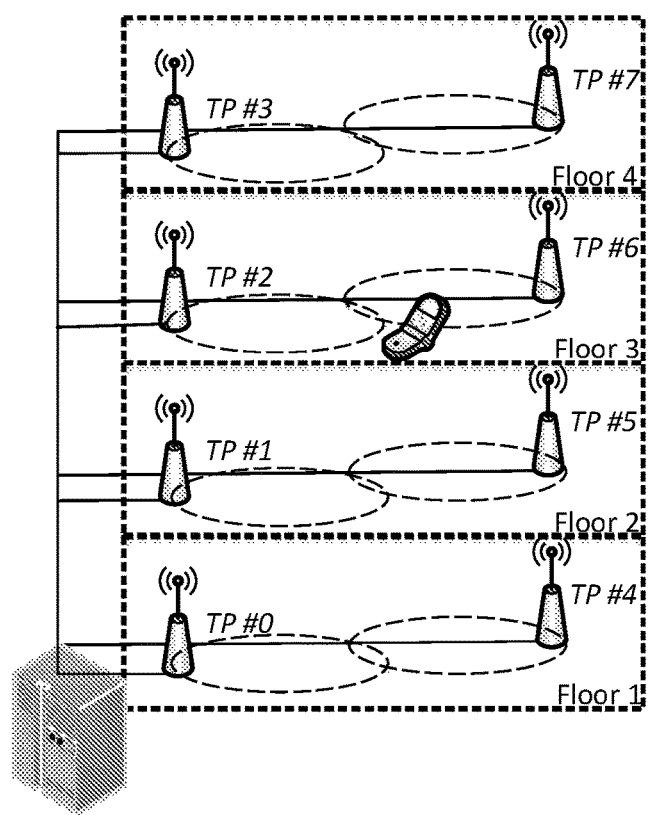
FIG. 6 illustrates one specific example of the base station of FIG. 5 in a typical indoor or small-cell scenario.

FIG. 6 illustrates one specific example of the eNB 12 of FIG. 5 in a typical indoor or small-cell scenario. In this example, there are multiple TPs 20 on each floor of a building. All of the TPs 20 may share the same PCI. By enabling the eNB 12 to signal the Cell Portion IDs of the TPs 20 to the E-SMLC 14, the TPs 20 can be separated geographically from a positioning perspective. For example, the coverage area of a particular TP 20 is associated with one Cell Portion ID. By associating the Cell Portion ID with its own PRS (referred to herein as an ePRS), the corresponding TP 20 can be separated, for positioning purposes, as if it were an eNB.

For cells with cell portions defined, a new PRS transmission can be transmitted simultaneously with the legacy PRS transmission. The new PRS is referred to herein as an ePRS. For example, antenna ports of a macro eNB transmits legacy PRS, and TPs 20 connected to the same DU 22 transmit new PRSs independently.

PRS Mapping

FIG. 6 illustrates an indoor small-cell scenario with multiple TPs 20 on each floor. All TPs 20 may share the same PCI. The eNB can signal the Cell Portion ID to the E-SMLC 14, and therefore the TPs 20 can be separated geographically from a positioning perspective. For example, the coverage area of a TP 20 is associated with one Cell Portion ID. By associating the Cell Portion ID with its own (e)PRS, the corresponding TP 20 can be separated as if it were an eNB.

For cells with cell portions defined, a PRS transmission in accordance with embodiments of the present disclosure can be transmitted with the legacy PRS transmission (e.g., simultaneously or substantially simultaneously with the legacy PRS transmission). The new PRS can also be labeled as an evolved PRS (called ePRS hereafter). For example, antenna ports of a macro eNB transmits legacy PRS, and TPs 20 connected to the same DU 22 transmit new PRSs independently.

The ePRSs are sent by TPs 20 (such as distributed antennas and/or RRHs). For brevity of discussion, label the Antenna Port (AP) of a TP 20 sending the new PRS as AP 106. It is understood that when there are multiple non-co-located TPs 20 deployed in a cell, each TP 20 may be associated with a different AP, e.g., TP1 is associated with AP 106 and Cell Portion ID #1, TP2 is associated with AP 206 and Cell Portion ID #2, TP3 is associated with AP 306 and Cell Portion ID #3, etc. In some embodiments, in order to avoid interference between the cells separated by Cell Portion ID, the PRS patterns transmitted from different TPs 20 have different PRS patterns. Hence, the new PRS mapping to a Resource Element (RE) can be defined as, for example, described in the following embodiments.

In a first embodiment, the existing PRS pattern (i.e., the PRS pattern defined in the current LTE specifications) is reused. However, the frequency shift is defined as a function of Cell Portion ID, $N_{ID}^{cellPortion}$, and cell ID, $N_{ID}^{cell}$. That is, $$v_{shift} = (N_{ID}^{cell} + N_{ID}^{cellPortion}) \bmod 6$$

where $v_{shift}$ is the frequency shift. This would ensure that the ePRS sent by AP 106 does not overlap with the PRS sent by the legacy AP 6 of the same cell, except in cases where $N_{ID}^{cellPortion}=0$. Note here that all Cell Portions share the same cell ID, $N_{ID}^{cell}$, but have a different Cell Portion ID, $N_{ID}^{Portion}$.

In a second embodiment, a new PRS pattern in a Physical Resource Block (PRB) can be defined for ePRS. One example of such a pattern with the improved correlation property is illustrated in the FIG. 7, where compared to the legacy pattern shown in FIG. 3, the REs in last two symbols are adjusted such that the PRS REs are distributed more evenly in the frequency direction. In particular, FIG. 7 illustrates the new PRS patterns (with normal Cyclic Prefix (CP)) for one/two Physical Broadcast Channel (PBCH) ports and four PBCH ports. To differentiate simultaneous ePRS transmissions from different TPs 20, different TPs 20 may use ePRS with certain different parameters, such as (a) different frequency shift in terms of RE mapping within a PRB, (b) different PRS sequences, etc.

In a third embodiment, the set of PRBs that AP 106 uses to send ePRS is different from the set of PRBs that AP 6 uses to send PRS. In particular, TPs 20 of different Cell Portion IDs can occupy non-overlapping portions of the bandwidth (i.e., the system bandwidth) in the same subframe, so that several TPs 20 can transmit ePRS simultaneously.

For example, TPs 20 associated with Cell Portion ID {1, 2, 3, 4} are scheduled to send ePRS in the same subframe(s). The system bandwidth is 20 megahertz (MHz) (or 100 PRBs).

Figure 8:
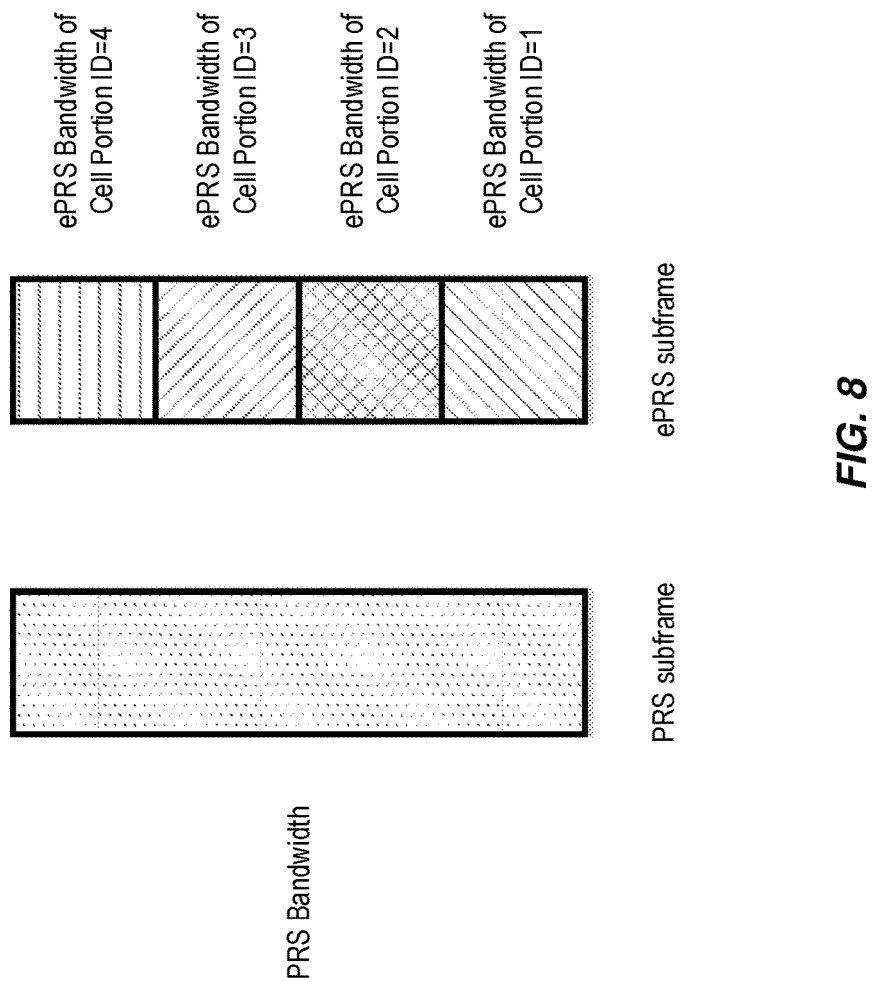
FIG. 8 illustrates an example in which ePRSs are transmitted in different portions of the system bandwidth as a function of the cell portion identifiers associated with the respective Transmit Points (TPs) in accordance with some embodiments of the present disclosure.

TP of Cell Portion ID=1 occupies PRBs #0-24;
TP of Cell Portion ID=2 occupies PRBs #25-49;
TP of Cell Portion ID=3 occupies PRBs #50-74;
TP of Cell Portion ID=4 occupies PRBs #75-99;

This is further illustrated in FIG. 8. Note that the mapping between the Cell Portion ID and the portion of the system bandwidth in which the ePRS is transmitted may be pre-defined, e.g., by standard or may be assigned in a desired manner (e.g., randomly).

Figure 9:
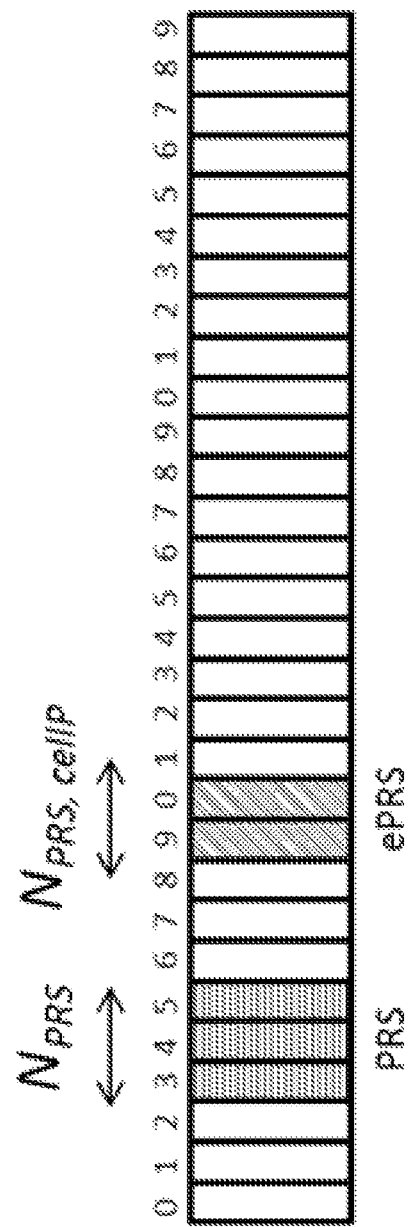
FIG. 9 illustrates an example in which ePRS and PRS occasions do not overlap in time in accordance with some embodiments of the present disclosure.

New PRS Subframe Configuration ePRS is transmitted in $N_{PRS,cellP}$ consecutive downlink subframes, where $N_{PRS,cellP}$ is configured by higher layers. The group of ePRSs should be scheduled in a way such that it does not overlap with the legacy PRS transmission. One such example is shown in FIG. 9, where the ePRS occasion and the PRS occasion are separated in time. However, in some other embodiments, the ePRS occasion and the PRS occasion are adjacent in time such that, together, the ePRS occasion and the PRS occasion form a continuous ePRS/PRS occasion in time.

In some embodiments, the PRS instances, for the first subframe of the $N_{PRS,cellP}$ downlink subframes, satisfies:

$$(10 \times n_f + \lfloor n_s/2 \rfloor - \Delta_{PRS} - \Delta_{PRS,cellP}) \bmod T_{PRS} = 0.$$

While in the above, the periodicity of the ePRS can be configured to be the same as $T_{PRS}$ of the PRS of the same cell, in general, the ePRS can be configured with its own periodicity $T_{ePRS}$. Other parameters of ePRS can be configured individually as well, such as its muting pattern.

Protocol Signaling

Using LPP, the location server (the E-SMLC 14 or a Secure User Plane Location Platform (SLP)) can send the assistance information to the UE 24 to utilize ePRS and Cell Portion information, in addition to existing PRS information. In response, the UE 24 reports the additional Reference Signal Time Difference (RSTD) measurements corresponding to the Cell Portions to the E-SMLC 14 through LPP. At the E-SMLC 14, OTDOA positioning is carried out based on the data of a group of TP locations, RSTD measurements, and Cell Portion IDs.

In some embodiments, in the LPP protocol, the following parameters are added to LPP signaling sent to the UE 24 for ePRS configuration:

Cell Portion ID(s) that the UE 24 can perform measurement from ePRS;
Physical location of the TP(s) 20 associated with each Cell Portion ID;
Configuration parameters of ePRS, including (if defined separately from those of PRS):
  Time domain parameters:
    $N_{PRS,cellP}$;
    $\Delta_{PRS,cellP}$;
    $T_{ePRS}$;
    Muting pattern of ePRS;
  Frequency domain: The set of PRBs that ePRS of each Cell Portion is sent on.

LPP Configuration

In some embodiments, the LPP protocol is modified to enable ePRS-based positioning. In particular, in some embodiments, the Cell Portion and ePRS information is added to in the field of "OTDOA-ReferenceCellInfo." The IE OTDOA-ReferenceCellInfo is used by the location server (e.g., the E-SMLC 14) to provide assistance data reference cell information for OTDOA assistance data. Further, a new IE "eprs-info" can be defined and included in the OTDOA Assistance Data Elements in 3GPP TS 36.455 V12.2.0. For example, the modifications can be as illustrated in FIG. 10.

LPP Annex (LPPa) Configuration

In some embodiments, the LPPa protocol is also modified to enable ePRS-based positioning. In particular, in some embodiments, the "OTDOA INFORMATION RESPONSE" message can be enhanced to include cell portion information. The OTDOA INFORMATION RESPONSE is a message is sent by the eNB 12 to the E-SMLC 14 to provide OTDOA information. The modified OTDOA INFORMATION RESPONSE is illustrated in FIG. 11. As also illustrated in FIG. 11, the IE "OTDOA Cell Portion Information" contains OTDOA information of a cell portion.

Figure 12:
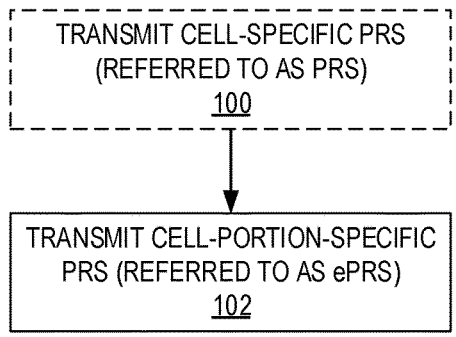
FIGS. 12 through 14 are flow charts that illustrate the operation of various nodes in the cellular communications system of FIG. 5 in accordance with embodiments of the present disclosure.
Figure 13A:
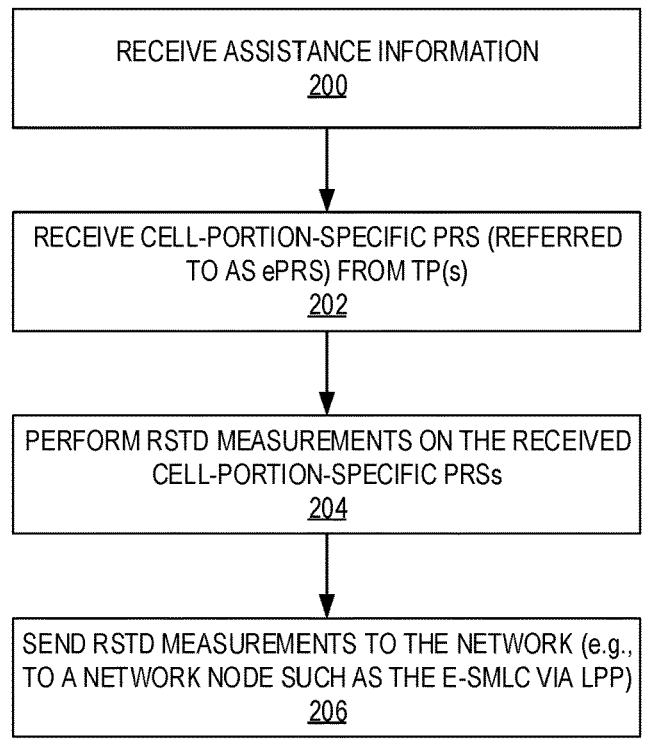
Figure 13B:
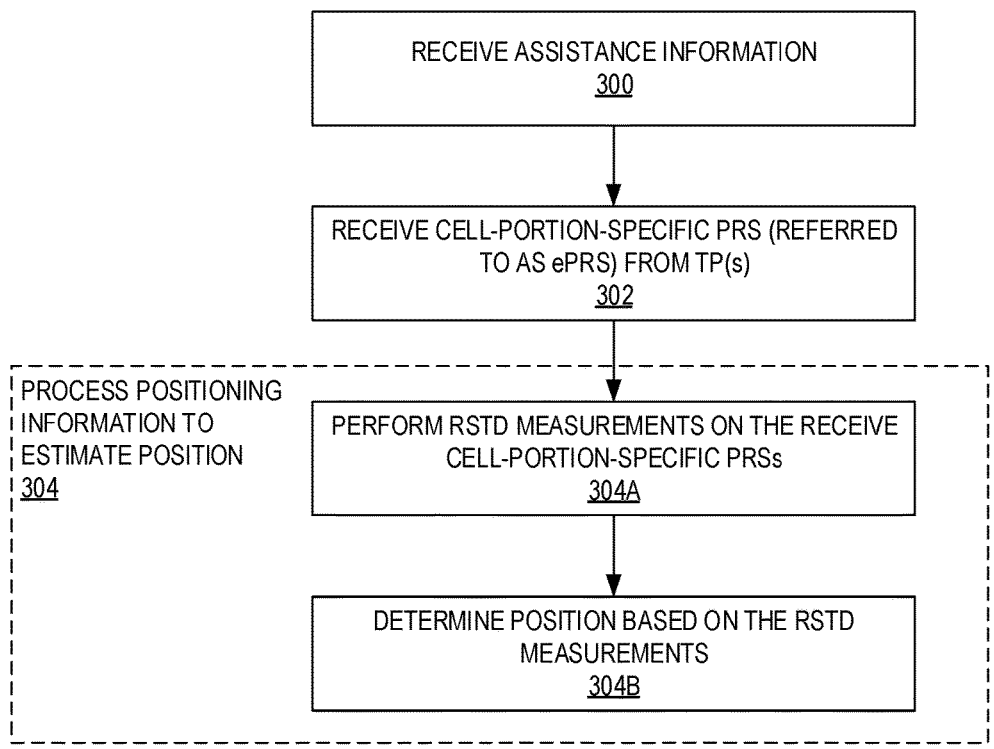
Figure 14:
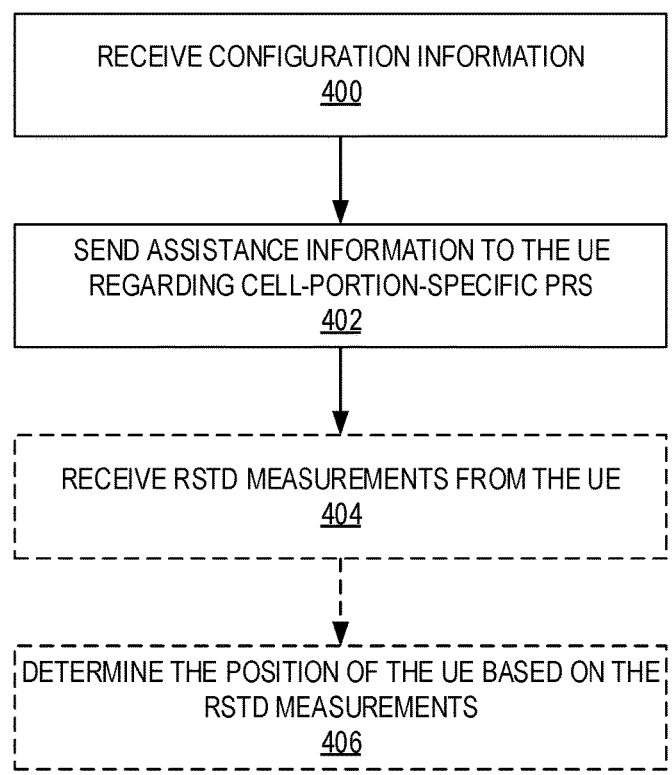

FIGS. 12 through 14 are flow charts that illustrate the operation of various nodes in the cellular communications system 10 of FIG. 5 in accordance with embodiments described above. In particular, FIG. 12 is a flow chart that illustrates the operation of one of the TPs 20 in accordance with embodiments of the present disclosure. This process is equally applicable to the other TPs 20. As illustrated, optionally (as indicated by the dashed box), the TP 20 transmits a cell-specific PRS (referred to herein simply as a PRS) (step 100). This cell-specific PRS is, for example, the legacy PRS transmitted in a LTE network. The same cell-specific PRS is also transmitted by each of the other TPs 20 in the shared cell (i.e., having the same PCI).

The TP 20 also transmits a cell-portion-specific PRS (referred to herein as an ePRS, as described above (step 102). As described above, one or more parameters of the ePRS are a function of a cell portion ID of the TP 20. The one or more parameters of the ePRS that are a function of the cell portion ID may include, as described above, a frequency shift of the ePRS, a portion of a system bandwidth in which the ePRS is transmitted, and/or a PRS sequence used for the ePRS. In addition, the ePRS may use a new PRS pattern (i.e., one that is different than the PRS pattern used for the PRS of step 100). In some embodiments, the timing of the ePRS may be such that it does not overlap, in time, the PRS, as described above.

FIGS. 13A and 13B are flow charts that illustrate the operation of the UE 24 according to some embodiments of the present disclosure. In FIG. 13A, the UE 24 sends RSTD measurements to the E-SMLC 14 for position determination. Conversely, in FIG. 13B, the UE 24 uses its own RSTD measurements to determine its own position.

More specifically, as illustrated in FIG. 13A, the UE 24 receives assistance information that enables the UE 24 to perform RSTD measurements on the cell-portion-specific PRSs (ePRSs) transmitted by the TPs 20 in a shared cell (step 200). As described above, this assistance information is received by the UE 24 from the E-SMLC 14 via LPP. In some embodiments, the assistance information includes:

a list of cell portion IDs corresponding to the ePRSs transmitted by the TPs 20 in the shared cell; and
ePRS information for each cell portion ID, which may include, for each cell portion ID:
  an ePRS bandwidth of the respective ePRS, which is the portion of the system bandwidth in which the ePRS is transmitted;
  an ePRS Configuration Index for the respective ePRS, which maps to the periodicity $T_{ePRS}$ of the ePRS and the subframe offset $\Delta_{PRS,cellP}$ of the ePRS;
  $N_{PRS,cellP}$, which is the number of consecutive downlink subframes in each ePRS occasion of the respective ePRS; and/or
  ePRS muting information, which provides, e.g., a muting pattern for the respective ePRS.

Note that the assistance information may additionally include assistance information that enables the UE 24 to receive PRSs on other cells (e.g., neighboring cell(s)) or even ePRSs on cell portions of other cells (e.g., cell portions of neighboring cell(s)).

Using the assistance information, the UE 24 receives the cell-portion-specific PRSs (ePRSs) from one or more of the TPs 20, depending on the position of the UE 24 (step 202). The UE 24 may also receive one or more PRSs from one or more other cells (e.g., from neighboring cells) and/or one or more ePRSs from one or more cell portions of one or more other cells (e.g., one or more cell portions of one or more neighboring cells). The UE 24 performs RSTD measurements on the received cell-portion-specific PRSs (ePRSs) (step 204). Optionally, the UE 24 may also perform RSTD measurements on one or more other cell-specific PRSs and/or one or more other ePRSs of cell portions of one or more other cells. In this embodiment, the UE 24 sends the RSTD measurements to the network (e.g., to a network node such as the E-SMLC 14 via LPP) (step 206). As described herein, the network node (e.g., the E-SMLC 14) determines the position of the UE 24 based on the RSTD measurements and known positions of the TPs 20 assigned to the respective cell portions (and optionally known positions of the radio access nodes originating any other the cell-specific PRSs or cell-portion-specific ePRSs received and measured by the UE 24).

The embodiment of FIG. 13B is similar to that of FIG. 13A, but where the UE 24 determines the position of the UE 24. As illustrated, the UE 24 receives assistance information that enables the UE 24 to perform RSTD measurements on the cell-portion-specific PRSs (ePRSs) transmitted by the TPs 20 in a shared cell (step 300). As described above, this assistance information is received by the UE 24 from the E-SMLC 14 via LPP. In some embodiments, the assistance information includes:
- a list of cell portion IDs corresponding to the ePRSs transmitted by the TPs 20 in the shared cell; and
- ePRS information for each cell portion ID, which may include, for each cell portion ID:
  - an ePRS bandwidth of the respective ePRS, which is the portion of the system bandwidth in which the ePRS is transmitted;
  - an ePRS Configuration Index for the respective ePRS, which maps to the periodicity $T_{ePRS}$ of the ePRS and the subframe offset $\Delta_{PRS,cellP}$ of the ePRS;
  - $N_{PRS,cellP}$, which is the number of consecutive downlink subframes in each ePRS occasion of the respective ePRS; and/or
  - ePRS muting information, which provides, e.g., a muting pattern for the respective ePRS.

In addition, in this embodiment, the assistance information includes the positions of the TPs 20 associated with, or assigned to, the respective cell portions. Note that the assistance information may additionally include assistance information that enables the UE 24 to receive PRSs on other cells (e.g., neighboring cell(s)) or even ePRSs on cell portions of other cells (e.g., cell portions of neighboring cell(s)).

Using the assistance information, the UE 24 receives the cell-portion-specific PRSs (ePRSs) from one or more of the TPs 20, depending on the position of the UE 24 (step 302). The UE 24 may also receive one or more PRSs from one or more other cells (e.g., from neighboring cells) and/or one or more ePRSs from one or more cell portions of one or more other cells (e.g., one or more cell portions of one or more neighboring cells). Using the positioning information (i.e., the positions of the TPs 20 included in the assistance information and the received cell-portion-specific PRSs (ePRSs)), the UE 24 estimates its position (step 304). More specifically, the UE 24 performs RSTD measurements on the received cell-portion-specific PRSs (ePRSs) (step 304A). Optionally, the UE 24 may also perform RSTD measurements on one or more other cell-specific PRSs and/or one or more other ePRSs of cell portions of one or more other cells. The UE 24 determines the position of the UE 24 based on the RSTD measurements and the known positions of the respective TPs 20 (and optionally known positions of the radio access nodes originating any other the cell-specific PRSs or cell-portion-specific ePRSs received and measured by the UE 24) using, e.g., a known multilateration technique (step 304B). Just to be clear, multilateration requires RSTD measurements from multiple TPs and/or base stations, where these multiple TPs and/or base stations include at least one of the TPs 20 in the shared cell. In some embodiments, multilateration may be performed based only on RSTD measurements received for multiple TPs (e.g., at least two of the TPs 20 or preferably at least three of the TPs 20) in the shared cell. However, in other embodiments, multilateration may be performed based on RSTD measurement(s) from a TP(s) 20 in the shared cell and one or more RSTD measurements for, e.g., a base station(s) of a neighboring cell(s) and/or TP(s) 20 in respective cell portions of one or more neighboring cells.

FIG. 14 is a flow chart that illustrates the operation of the E-SMLC 14 according to some embodiments of the present disclosure. As illustrated, the E-SMLC 14 receives configuration information from the eNB 12, as described above (step 400). This configuration is received via LPPa. As described above, the configuration information includes:
- OTDOA cell portions, which are the cell portions used by the TPs 20 in the shared cell of the eNB 12; and
- OTDOA cell portion information, which includes, for each of the cell portions identified by the OTDOA cell portion configuration information:
  - cell portion ID;
  - an ePRS bandwidth of the respective ePRS, which is the portion of the system bandwidth in which the ePRS for the cell portion is transmitted;
  - an ePRS Configuration Index for the respective ePRS, which maps to the periodicity $T_{ePRS}$ of the ePRS and the subframe offset $\Delta_{PRS,cellP}$ of the ePRS for the cell portion;
  - $N_{PRS,cellP}$, which is the number of consecutive downlink subframes in each ePRS occasion of the respective ePRS for the cell portion;
  - ePRS muting information, which provides, e.g., a muting pattern for the respective ePRS for the cell portion; and/or
  - the positions of the TP(s) 20 associated with, or assigned to, the cell portion.

The configuration information may also include configuration regarding a cell-specific PRS transmitted by the eNB 12. Using at least a portion of the configuration information received from the eNB 12, the E-SMLC 14 sends assistance information to the UE 24, as described above (step 402).

In some embodiments (i.e., optionally), the E-SMLC 14 receives, from the UE 24, RSTD measurements for one or more of the cell portions (i.e., for the cell-portion-specific PRS (ePRS) received by the UE 24 from one or more of the TPs 20) (step 404). Optionally, the E-SMLC 14 additionally receives, from the UE 24, RSTD measurements for one or more other cells and/or one or more cell portions of one or more other cells. The RSTD measurements may be received from the UE 24 via the LPP. The E-SMLC 14 optionally determines the position of the UE 24 based on the received RSTD measurements from the UE 24 and the known positions of the TPs 20 associated with the respective cell portions (and optionally known positions of the radio access nodes originating any other the cell-specific PRSs or cell-portion-specific ePRSs received and measured by the UE 24) (step 406). While not illustrated, the E-SMLC 14 may then utilize the position of the UE 24 in any desired manner (e.g., provide the position to the UE 24 for use by the UE 24, provide the position to another network node, e.g., for use by that other network node, provide the position of the UE 24 to some third-party service such as, e.g., an emergency service or a position-based advertisement service, or the like).

Figure 15:
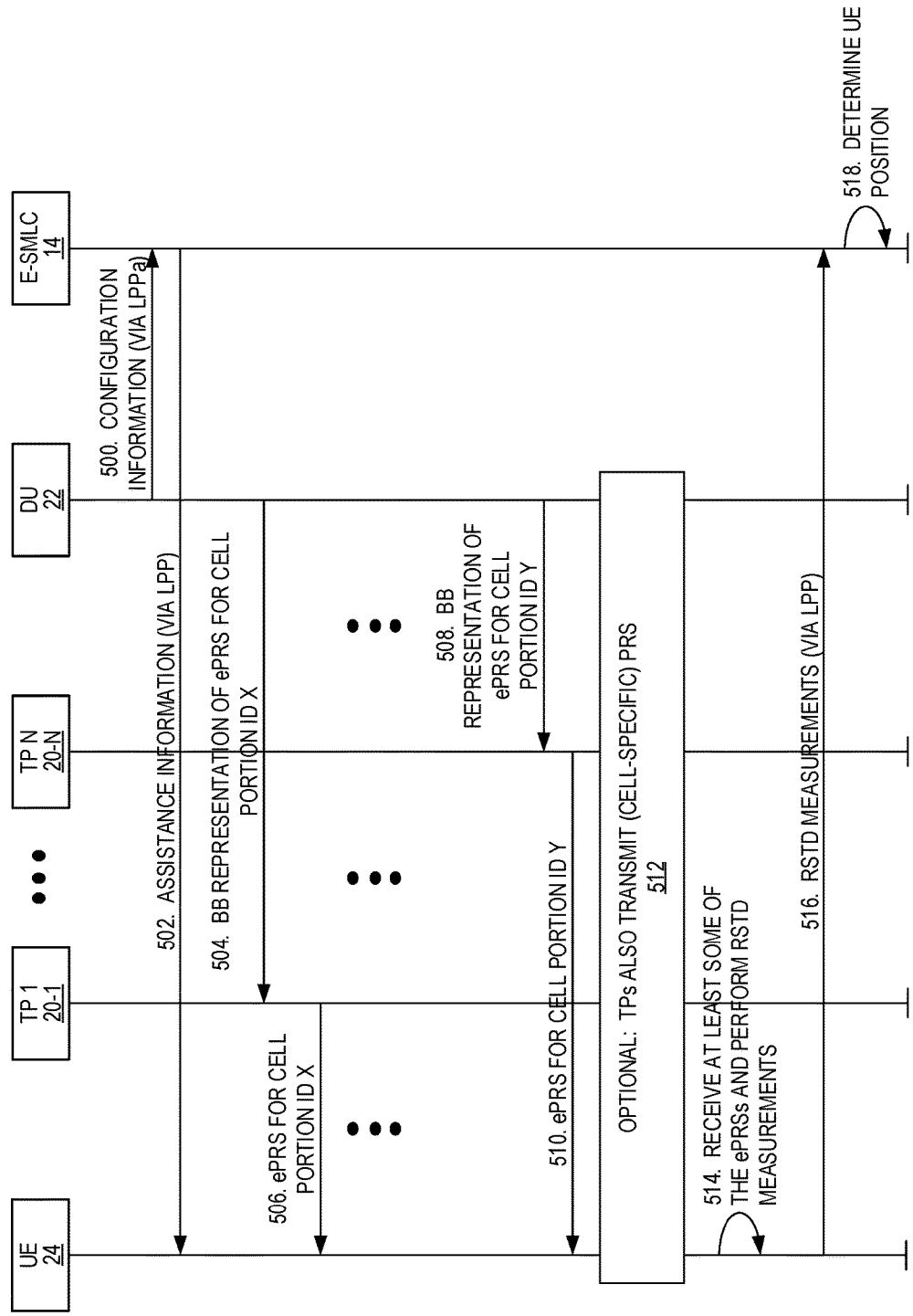
FIGS. 15 and 16 illustrate the operation of the cellular communications system of FIG. 5 in accordance with some embodiments of the present disclosure.
Figure 16:
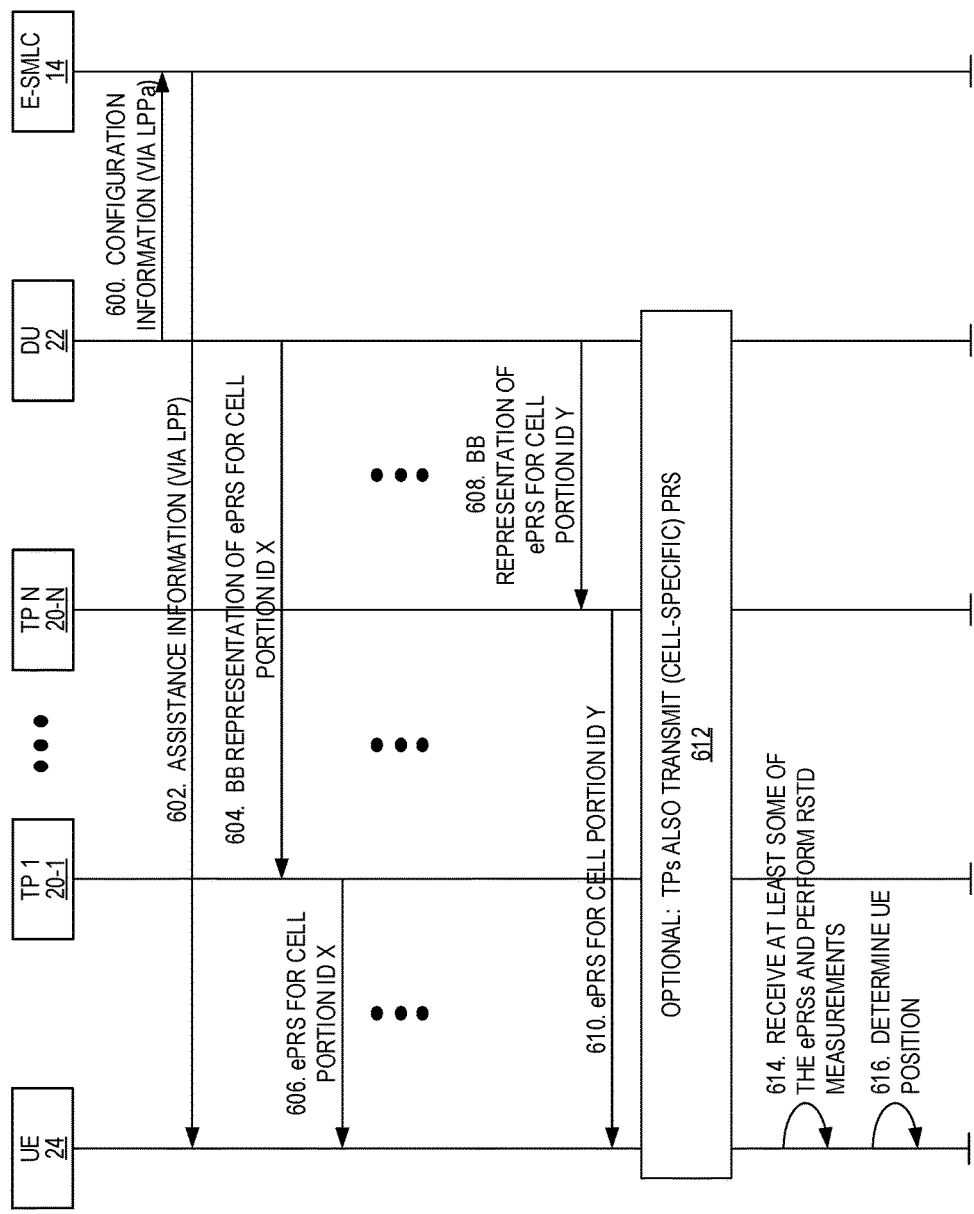

FIGS. 15 and 16 illustrate the operation of the cellular communications system 10 of FIG. 5 in accordance with embodiments of the present disclosure described above. FIG. 15 illustrates an embodiment in which the position of the UE 24 is determined by the E-SMLC 14 based on RSTD measurements received from the UE 24. Conversely, FIG. 16 illustrates an embodiment in which the UE 24 determines its own position based on RSTD measurements performed by the UE 24 and known positions of the respective TPs 20.

In this regard, as illustrated in FIG. 15, the DU 22 (i.e., the eNB 12) sends configuration information to the E-SMLC 14 via LPPa, as described above (step 500). The E-SMLC 14 sends assistance information to the UE 24 via LPP as described above (step 502). The E-SMLC 14 may send the assistance information when, for example, the E-SMLC 14 desires to know the position of the UE 24.

In this example, the DU 22 sends a Baseband (BB) representation of the ePRS for cell portion ID X to the TP 20-1 assigned to cell portion X (step 504). The TP 20-1 receives the BB representation of the ePRS for cell portion ID X and processes (e.g., upconversion, Digital-to-Analog (D/A) conversion, amplification, etc.) the BB representation of the ePRS for cell portion ID X to transmit the ePRS for cell portion ID X (step 506). In the same manner, the other TPs 20 transmit ePRSs for the respective cell portions. For example, the DU 22 sends a BB representation of the ePRS for cell portion ID Y to the TP 20-N assigned to cell portion Y (step 508). The TP 20-N receives the BB representation of the ePRS for cell portion ID Y and processes (e.g., upconversion, D/A conversion, amplification, etc.) the BB representation of the ePRS for cell portion ID Y to transmit the ePRS for cell portion ID Y (step 510). Optionally, in a similar manner, the TPs 20-1 through 20-N transmit the cell-specific PRSs (step 512).

As described above, using the assistance information received from the E-SMLC 14, the UE 24 receives at least some of the ePRSs (i.e., one or more of the ePRSs) transmitted by the TPs 20-1 through 20-N and performs RSTD measurements on the received ePRSs (step 514). The UE 24 may also receive PRS(s) from another cell(s) and/or ePRS(s) from a cell portion(s) of another cell(s) and perform RSTD measurements on those (e)PRS(s). The UE 24 sends the RSTD measurements to the E-SMLC 14 via LPP (step 516). The E-SMLC 14 determines the position of the UE 24 based on the RSTD measurements (step 518).

FIG. 16 illustrates an embodiment that is substantially the same as that of FIG. 15 but where the UE 24 determines its own position. As illustrated, the DU 22 (i.e., the eNB 12) sends configuration information to the E-SMLC 14 via LPPa, as described above (step 600). The E-SMLC 14 sends assistance information to the UE 24 via LPP as described above (step 602). In this embodiment, the assistance information includes the positions of the TPs 20. Note, however, that the positions of the TPs 20 may be provided to the UE 24 by a mechanism other than the assistance information (e.g., in some other form of signaling between the UE 24 and the network). The E-SMLC 14 may send the assistance information when, for example, the E-SMLC 14 desires to know the position of the UE 24.

In this example, the DU 22 sends a BB representation of the ePRS for cell portion ID X to the TP 20-1 assigned to cell portion X (step 604). The TP 20-1 receives the BB representation of the ePRS for cell portion ID X and processes (e.g., upconversion, D/A conversion, amplification, etc.) the BB representation of the ePRS for cell portion ID X to transmit the ePRS for cell portion ID X (step 606). In the same manner, the other TPs 20 transmit ePRSs for the respective cell portions. For example, the DU 22 sends a BB representation of the ePRS for cell portion ID Y to the TP 20-N assigned to cell portion Y (step 608). The TP 20-N receives the BB representation of the ePRS for cell portion ID Y and processes (e.g., upconversion, D/A conversion, amplification, etc.) the BB representation of the ePRS for cell portion ID Y to transmit the ePRS for cell portion ID Y (step 610). Optionally, in a similar manner, the TPs 20-1 through 20-N transmit the cell-specific PRSs (step 612).

As described above, using the assistance information received from the E-SMLC 14, the UE 24 receives at least some of the ePRSs (i.e., one or more of the ePRSs) transmitted by the TPs 20-1 through 20-N and performs RSTD measurements on the received ePRSs (step 614). The UE 24 may also receive PRS(s) from another cell(s) and/or ePRS(s) from a cell portion(s) of another cell(s) and perform RSTD measurements on those (e)PRS(s). In this embodiment, the UE 24 determines the position of the UE 24 based on the RSTD measurements and the known positions of the TPs 20 of the respective cell portions (and, optionally, known positions of the radio access nodes of any other measured (e)PRS(s)) (step 616).

Figure 17:
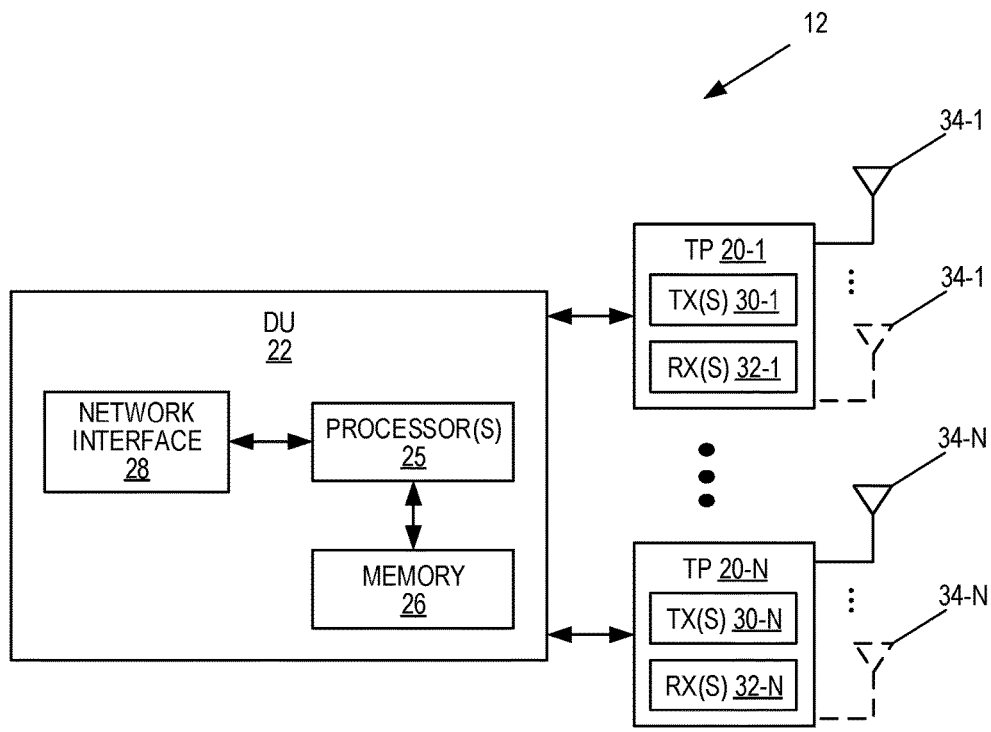
FIGS. 17 and 18 are block diagrams of the base station of FIG. 5 according to some embodiments of the present disclosure.
Figure 18:
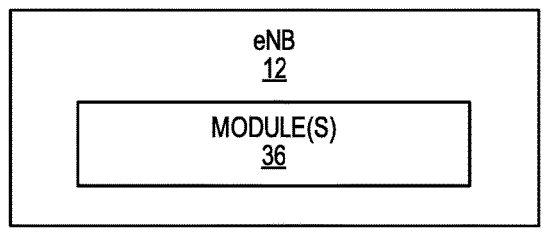

FIGS. 17 and 18 are block diagrams of the eNB 12 of FIG. 5 according to some embodiments of the present disclosure. As illustrated in FIG. 17, in some embodiments, the eNB 12 includes the DU 22 and the TPs 20-1 through 20-N. The DU 22 includes one or more processors 25 (e.g., one or more Central Processing Units (CPUs), one or more Application Specific Integrated Circuits (ASICs), one or more Field Programmable Gate Arrays (FPGAs), and/or the like), memory 26, and a network interface 28. The TPs 20-1 through 20-N, which are non-co-located, include respective transmitters 30-1 through 30-N and receivers 32-1 through 32-N coupled to respective antennas 34-1 through 34-N. While not illustrated, the TPs 20 may additionally include one or more processors and potentially memory, depending on the particular implementation. The network interface 28 enables the eNB 12 to communicate with other network nodes (e.g., the E-SMLC 14). In some embodiments, the functionality of the eNB 12 described above is fully or partially implemented in software that is stored, e.g., in the memory 26 and executed by the processor(s) 25. Further, the functionality of the TPs 20 described above may be implemented in hardware (e.g., the transmitters 30) or in a combination of hardware and software (e.g., processor(s) executing software instructions in addition to the transmitters 30).

In some embodiments, a computer program including instructions which, when executed by at least one processor, causes the at least one processor to carry out the functionality of the eNB 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

FIG. 18 is a block diagram of the eNB 12 according to some other embodiments of the present disclosure. As illustrated, the eNB 12 includes one or more modules 36, each of which is implemented in software. The module(s) 36 may include, for example, a configuration module that operates to send configuration information to the E-SMLC 14, as described above, via, e.g., a network interface of the eNB 12 (not shown in FIG. 18). The module(s) 36 may also include an ePRS transmission module(s) that operate to transmit ePRSs via the TPs 20, as described above.

Figure 19:
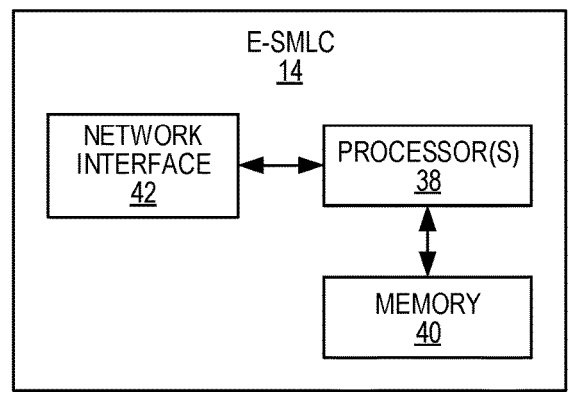
FIGS. 19 and 20 are block diagrams of the Enhanced Serving Mobile Location Center (E-SMLC) of FIG. 5 according to some embodiments of the present disclosure.
Figure 20:
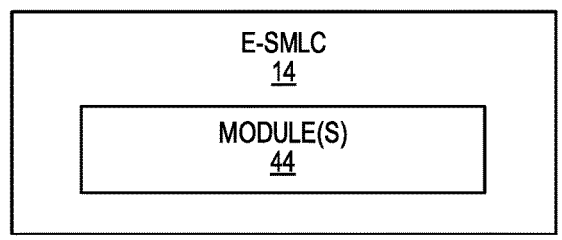

FIGS. 19 and 20 are block diagrams of the E-SMLC 14 according to some embodiments of the present disclosure. As illustrated in FIG. 19, in some embodiments, the E-SMLC 14 includes one or more processors 38 (e.g., one or more CPUs, one or more ASICs, one or more FPGAs, and/or the like), memory 40, and a network interface 42. In some embodiments, the functionality of the E-SMLC 14 described herein is implemented in software that is stored e.g., in the memory 40 and executed by the processor(s) 38.

In some embodiments, a computer program including instructions which, when executed by at least one processor, causes the at least one processor to carry out the functionality of the E-SMLC 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

FIG. 20 is a block diagram of the E-SMLC 14 according to some other embodiments of the present disclosure. As illustrated, the E-SMLC 14 includes one or more modules 44, each of which is implemented in software. The module(s) 44 may include, for example, a configuration information reception module that operates to receive configuration information from the eNB 12 (via an associated network interface of the E-SMLC 14, which is not shown), as described above. The module(s) 44 may also include, for example, an assistance information transmission module that operates to send assistance information to the UE 24 (via an associated network interface of the E-SMLC 14, which is not shown), as described above. The module(s) 44 may also include, for example, a position determination module that operates to determine the position of the UE 24 based on RSTD measurements received from the UE 24 and known positions of the TPs 20, as described above.

Figure 21:
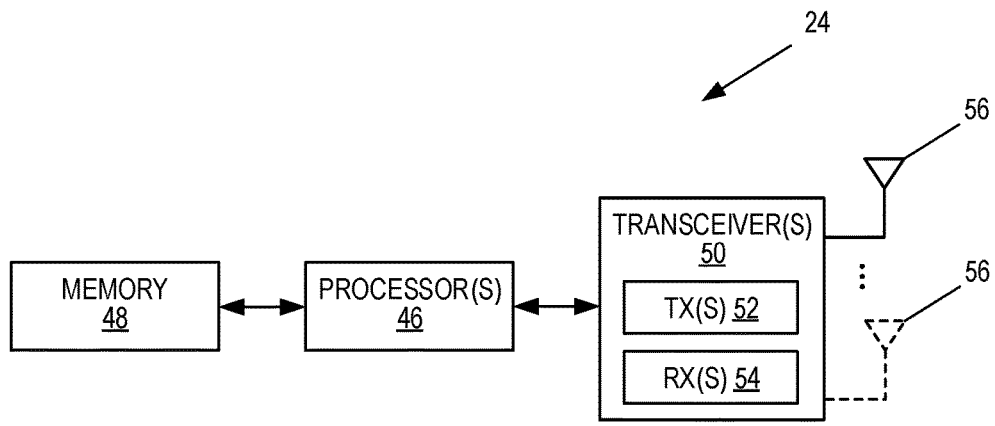
FIGS. 21 and 22 are block diagrams of the UE of FIG. 5 according to some embodiments of the present disclosure.
Figure 22:
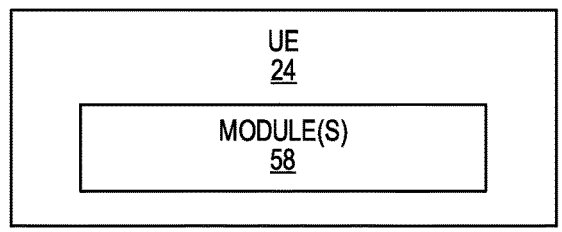

FIGS. 21 and 22 are block diagrams of the UE 24 according to some embodiments of the present disclosure. As illustrated in FIG. 21, in some embodiments, the UE 24 includes one or more processors 46 (e.g., one or more CPUs, one or more ASICs, one or more FPGAs, and/or the like), memory 48, and one or more transceivers 50 including one or more transmitters 52 and one or more receivers 54 coupled to one or more antennas 56. In particular embodiments, some or all of the functionality described above as being provided by UEs, Device-to-Device (D2D) devices, MTC or Machine-to-Machine (M2M) devices, and/or any other types of wireless communication devices may be provided by the device processor executing instructions stored on a computer-readable medium, such as the memory 48 shown in FIG. 21. Alternative embodiments of the wireless communication device may include additional components beyond those shown in FIG. 21 that may be responsible for providing certain aspects of the device's functionality, including any of the functionality described above and/or any functionality necessary to support the solution described above.

In some embodiments, a computer program including instructions which, when executed by at least one processor, causes the at least one processor to carry out the functionality of the UE 24 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 48).

FIG. 22 is a block diagram of the UE 24 according to some other embodiments of the present disclosure. As illustrated, the UE 24 includes one or more modules 58, each of which is implemented in software. The module(s) 58 may include, for example, an assistance information reception module that operates to receive (via an associated receiver(s) of the UE 24, which are not shown) assistance information from the network (e.g., the E-SMLC 14), as described above. The module(s) 58 may also include, for example, an ePRS reception module and an RSTD measurement module that operate to receive (via an associated receiver(s) of the UE 24, which are not shown) ePRSs and perform RSTD measurements, as described above. In some embodiments, the module(s) 58 include a reporting module that operates to send the RSTD measurements to the network (e.g., to the E-SMLC 14) (via an associated transmitter(s) of the UE 24, which are not shown). In other embodiments, the UE 24 includes a position determination module that operates to determine the position of the UE 24 based on the RSTD measurements, as described above.

Aspects of the embodiments include a method performed at a TP, the TP comprising a transceiver and a hardware processor, the method including transmitting a first positioning reference signal; and transmitting a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to a TP that includes a transceiver and a hardware processor, the TP configured to transmit a first positioning reference signal; and transmit a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to an apparatus adapted to transmit a first positioning reference signal; and transmit a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to an apparatus comprising means adapted to transmit a first positioning reference signal; and transmit a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to an apparatus including means for transmitting a first positioning reference signal; and means for transmitting a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to an apparatus comprising a first module configured to transmit a first positioning reference signal; and a second module configured to transmit a second positioning reference signal, the second positioning reference signal including a cell portion identifier associated with the TP (i.e., the second positioning reference signal can be differentiated from the first positioning reference signal as a result of different cell portion identifiers).

Aspects of the embodiments are directed to a computer program, comprising instructions which, when executed on at least one processor, cause the at least one processor to transmit a first positioning reference signal; and transmit a second positioning reference signal, the second positioning reference signal including a cell portion identifier associated with the TP (i.e., the second positioning reference signal can be differentiated from the first positioning reference signal as a result of different cell portion identifiers). A carrier containing the computer program of the previous claim can include an electronic signal, optical signal, radio signal, or computer readable storage medium.

Aspects of the embodiments are directed to a UE that includes a processor, memory, and transceiver. The UE is configured to receive cell portion identification information from a TP. In some embodiments, the UE is configured to receive, from a location server, assistance information. The assistance information can include information that allows the UE to use the cell portion information. The UE can use the positioning information and assistance information to estimate position (e.g., indoors).

The following acronyms are used throughout this disclosure.

3GPP Third Generation Partnership Project
5G Fifth Generation
AP Antenna Port
ASIC Application Specific Integrated Circuit
BB Baseband
CoMP Coordinated Multipoint
CP Cyclic Prefix
CPU Central Processing Unit
CRS Cell-Specific Reference Signal
D2D Device-to-Device
D/A Digital-to-Analog
DAS Distributed Antenna System
DU Detection Unit
DwPTS Downlink Pilot Time Slot
E-CID Enhanced Cell Identity
eNB Enhanced or Evolved Node B
ePRS Enhanced or Evolved Positioning Reference Signal
E-SMLC Enhanced Serving Mobile Location Center
E-UTRAN Evolved Universal Terrestrial Radio Access Node
FCC Federal Communication Commission
FPGA Field Programmable Gate Array
GMLC Gateway Mobile Location Centre
GNSS Global Navigation Satellite System
GPS Global Positioning System
ID Identity
IE Information Element
IoT Internet of Things
LPP Long Term Evolution Positioning Protocol
LPPa Long Term Evolution Positioning Protocol Annex
LTE Long Term Evolution
M2M Machine-to-Machine
MHz Megahertz
MME Mobility Management Entity
ms Millisecond
MTC Machine Type Communication
OTDOA Observed Time Difference of Arrival
PBCH Physical Broadcast Channel
PCI Physical Cell Identity
PDCCH Physical Downlink Control Channel
PDSCH Physical Downlink Shared Channel
PRB Physical Resource Block
PRS Positioning Reference Signal
RB Resource Block
RE Resource Element
RRC Radio Resource Control
RRH Remote Radio Head
RSTD Reference Signal Time Difference
SFN System Frame Number
SLP Secure User Plane Location Platform
TDD Time Division Duplexing
TOA Time of Arrival
TP Transmit Point
TS Technical Specification
UE User Equipment
US United States
UTDOA Uplink Time Difference of Arrival Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:
   receiving assistance information from the cellular communications network, the assistance information comprising information that enables the wireless device to receive cell portion specific Positioning Reference Signals, PRSs, from a plurality of non-co-located transmit points of a shared cell where a frequency-shift of each of the cell portion specific PRSs is a function of a cell portion identifier of a corresponding one of the non-co-located transmit points, wherein the function includes a modulo 6 operation performed on the cell portion identifier;
   receiving at least one of the cell portion specific PRSs from respective non-co-located transmit points of the shared cell; and
   performing Received Signal Time Difference, RSTD, measurements on the at least one of the cell portion identifier specific PRSs.

2. The method of claim 1 further comprising determining a position of the wireless device based on the RSTD measurements on the at least one of the cell portion specific PRSs.

3. The method of claim 1 further comprising sending the RSTD measurements on the at least one of the cell portion specific PRSs to a network node of the cellular communications network.

4. The method of claim 1 wherein the assistance information comprises a list of cell portion identifiers corresponding to the cell portion specific PRSs.

5. The method of claim 1 wherein the assistance information comprises physical locations of the non-co-located transmit points.

6. The method of claim 1 wherein the assistance information comprises one or more configuration parameters for the cell portion specific PRSs.

7. The method of claim 6 wherein, for each cell portion specific PRS, the one or more configuration parameters comprise one or more time-domain parameters for the cell portion specific PRS.

8. The method of claim 7 wherein the one or more time-domain parameters comprise one or more of a group consisting of:
   a number, $N_{PRS,cellP}$, of consecutive downlink subframes on which the cell portion specific PRS is transmitted in a PRS occasion;
   a subframe offset, $\Delta_{PRS,cellP}$, for a first subframe of the number, $N_{PRS,cellP}$, of consecutive downlink subframes on which the cell portion specific PRS is transmitted in a PRS occasion;
   a periodicity, $T_{PRS}$, of the cell portion specific PRS; and
   a muting pattern of the cell portion specific PRS.

9. The method of claim 6 wherein, for each cell portion specific PRS, the one or more configuration parameters comprise one or more frequency-domain parameters for the cell portion specific PRS.

10. The method of claim 9 wherein, for each cell portion specific PRS, the one or more frequency-domain parameters comprise information that indicates a set of physical resource blocks in the frequency domain in which the cell portion specific PRS is transmitted.

11. A wireless device for operation in a cellular communications network, comprising:
   a transceiver;
   at least one processor operable to:
      receive, via the transceiver, assistance information from the cellular communications network, the assistance information comprising information that enables the wireless device to receive cell portion specific Positioning Reference Signals, PRSs, from a plurality of non-co-located transmit points of a shared cell where a frequency-shift of each of the cell portion specific PRSs is a function of a cell portion identifier of a corresponding one of the non-co-located transmit points, wherein the function includes a modulo 6 operation performed on the cell portion identifier;
      receive, via the transceiver, at least one of the cell portion specific PRSs from respective non-co-located transmit points of the shared cell; and
      perform Received Signal Time Difference, RSTD, measurements on at least one of the cell portion identifier specific PRSs.

\* \* \* \* \*